United States Patent
Zhou et al.

(10) Patent No.: US 8,810,182 B2
(45) Date of Patent: Aug. 19, 2014

(54) ADAPTIVE HARMONIC REDUCTION APPARATUS AND METHODS

(71) Applicants: Hua Zhou, Cambridge (CA); Zhongyuan Cheng, Cambridge (CA); Navid Zargari, Cambridge (CA)

(72) Inventors: Hua Zhou, Cambridge (CA); Zhongyuan Cheng, Cambridge (CA); Navid Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 125 days.

(21) Appl. No.: 13/648,514

(22) Filed: Oct. 10, 2012

(65) Prior Publication Data

US 2013/0033907 A1 Feb. 7, 2013

Related U.S. Application Data

(63) Continuation-in-part of application No. 12/894,646, filed on Sep. 30, 2010, now Pat. No. 8,471,514.

(51) Int. Cl.
*H02P 1/30* (2006.01)
*H02M 1/12* (2006.01)

(52) U.S. Cl.
CPC ........................................ *H02M 1/12* (2013.01)
USPC ........... 318/503; 318/494; 318/811; 318/810; 318/807; 318/767

(58) Field of Classification Search
CPC ..................................... H02M 1/12; H02J 3/01
USPC .......... 318/503, 494, 811, 810, 807, 767, 727
See application file for complete search history.

(56) References Cited

U.S. PATENT DOCUMENTS

| | | | |
|---|---|---|---|
| 5,319,513 A | 6/1994 | Lowenstein et al. | |
| 6,166,929 A | 12/2000 | Ma et al. | |
| 6,269,010 B1 | 7/2001 | Ma et al. | |
| 6,366,483 B1 | 4/2002 | Ma et al. | |
| 6,525,951 B1 | 2/2003 | Paice | |
| 6,642,689 B2 | 11/2003 | Ishida et al. | |
| 7,274,576 B1 | 9/2007 | Zargari et al. | |
| 7,495,410 B2 | 2/2009 | Zargari et al. | |
| 7,495,938 B2 | 2/2009 | Wu et al. | |
| 7,511,976 B2 | 3/2009 | Zargari et al. | |
| 8,023,234 B2 * | 9/2011 | Andersen | 361/42 |
| 2007/0211501 A1 | 9/2007 | Zargari et al. | |
| 2007/0297202 A1 | 12/2007 | Zargari et al. | |
| 2008/0180055 A1 | 7/2008 | Zargari et al. | |
| 2009/0128083 A1 | 5/2009 | Zargari et al. | |
| 2010/0025995 A1 | 2/2010 | Lang et al. | |
| 2010/0080028 A1 | 4/2010 | Cheng et al. | |
| 2012/0081061 A1 | 4/2012 | Zargari et al. | |

OTHER PUBLICATIONS

Zhou, Hau et al., "Design and Implementation of Selective Harmonic Compensation (SHC) PWM for a High Power Current Source Rectifier", Apr. 2012.

(Continued)

*Primary Examiner* — David Luo
(74) *Attorney, Agent, or Firm* — Fay Sharpe LLP

(57) ABSTRACT

Power conversion systems with active front end converters for example motor drives and power generation systems for distributed energy sources are presented with adaptive harmonic minimization for grid-tie converters for minimized or reduced total harmonic distortion in the line current spectrum including the source harmonic current, the load harmonics and the PWM harmonics.

22 Claims, 19 Drawing Sheets

(56) References Cited

OTHER PUBLICATIONS

Zhou, Hau et al., "Selective Harmonic Compensation (SHC) PWM for Grid-Interfacing High-Power Converters", pp. 1-7, published at the IEEE conference ECCE in Sep. 2011.

Zhou, Hau, "Harmonic Current Control in a High-Power Current Source Rectifier System", a thesis submitted to the Faculty of Graduate Studies and Research in partial fulfillment of the requirements for a degree of Master of Science in Power Engineering and Power Electronics, Chapter 3, Jan. 2011, Alberta, Canada.

Zhou, Hau, "Selective Harmonic Compensation (SHC) PWM for Grid-Interfacing High-Power Converters", pp. 1-11, IEEE Transaction, Apr. 2012.

* cited by examiner

SWITCHING ANGLE SET TABLE 152

| SIGNIFICANT HARMONICS RANGE | RECTIFIER DELAY ANGLE | MOTOR SPEED | SWITCHING ANGLE SET |
|---|---|---|---|
| RANGE 1 | DELAY ANGLE 1 | SPEED 1 | $\theta_{1,1}; \theta_{1,2}; \theta_{1,3}; \theta_{1,4}; \theta_{1,5}; \theta_{1,6}; \theta_{1,7}; \theta_{1,8}; \theta_{1,9}; ...; \theta_{1,18}$ |
| RANGE 1 | DELAY ANGLE 1 | SPEED 2 | $\theta_{2,1}; \theta_{2,2}; \theta_{2,3}; \theta_{2,4}; \theta_{2,5}; \theta_{2,6}; \theta_{2,7}; \theta_{2,8}; \theta_{2,9}; ...; \theta_{2,18}$ |
| RANGE 1 | DELAY ANGLE 2 | SPEED 1 | $\theta_{3,1}; \theta_{3,2}; \theta_{3,3}; \theta_{3,4}; \theta_{3,5}; \theta_{3,6}; \theta_{3,7}; \theta_{3,8}; \theta_{3,9}; ...; \theta_{3,18}$ |
| RANGE 1 | DELAY ANGLE 2 | SPEED 2 | $\theta_{4,1}; \theta_{4,2}; \theta_{4,3}; \theta_{4,4}; \theta_{4,5}; \theta_{4,6}; \theta_{4,7}; \theta_{4,8}; \theta_{4,9}; ...; \theta_{4,18}$ |
| RANGE 2 | DELAY ANGLE 1 | SPEED 1 | $\theta_{5,1}; \theta_{5,2}; \theta_{5,3}; \theta_{5,4}; \theta_{5,5}; \theta_{5,6}; \theta_{5,7}; \theta_{5,8}; \theta_{5,9}; ...; \theta_{5,18}$ |
| RANGE 2 | DELAY ANGLE 1 | SPEED 2 | $\theta_{6,1}; \theta_{6,2}; \theta_{6,3}; \theta_{6,4}; \theta_{6,5}; \theta_{6,6}; \theta_{6,7}; \theta_{6,8}; \theta_{6,9}; ...; \theta_{6,18}$ |
| RANGE 2 | DELAY ANGLE 2 | SPEED 1 | $\theta_{7,1}; \theta_{7,2}; \theta_{7,3}; \theta_{7,4}; \theta_{7,5}; \theta_{7,6}; \theta_{7,7}; \theta_{7,8}; \theta_{7,9}; ...; \theta_{7,18}$ |
| RANGE 2 | DELAY ANGLE 2 | SPEED 2 | $\theta_{8,1}; \theta_{8,2}; \theta_{8,3}; \theta_{8,4}; \theta_{8,5}; \theta_{8,6}; \theta_{8,7}; \theta_{8,8}; \theta_{8,9}; ...; \theta_{8,18}$ |
| RANGE 3 | DELAY ANGLE 1 | SPEED 1 | $\theta_{9,1}; \theta_{9,2}; \theta_{9,3}; \theta_{9,4}; \theta_{9,5}; \theta_{9,6}; \theta_{9,7}; \theta_{9,8}; \theta_{9,9}; ...; \theta_{9,18}$ |
| RANGE 3 | DELAY ANGLE 1 | SPEED 2 | $\theta_{10,1}; \theta_{10,2}; \theta_{10,3}; \theta_{10,4}; \theta_{10,5}; \theta_{10,6}; \theta_{10,7}; \theta_{10,8}; \theta_{10,9}; ...; \theta_{10,18}$ |
| RANGE 3 | DELAY ANGLE 2 | SPEED 1 | $\theta_{11,1}; \theta_{11,2}; \theta_{11,3}; \theta_{11,4}; \theta_{11,5}; \theta_{11,6}; \theta_{11,7}; \theta_{11,8}; \theta_{11,9}; ...; \theta_{11,18}$ |
| RANGE 3 | DELAY ANGLE 2 | SPEED 2 | $\theta_{12,1}; \theta_{12,2}; \theta_{12,3}; \theta_{12,4}; \theta_{12,5}; \theta_{12,6}; \theta_{12,7}; \theta_{12,8}; \theta_{12,9}; ...; \theta_{12,18}$ |
| ⋮ | ⋮ | ⋮ | ⋮ |
| RANGE N | DELAY ANGLE 1 | SPEED 1 | $\theta_{3N,1}; \theta_{3N,2}; \theta_{3N,3}; \theta_{3N,4}; \theta_{3N,5}; \theta_{3N,6}; \theta_{3N,7}; \theta_{3N,8}; \theta_{3N,9}; ...; \theta_{3N,18}$ |
| RANGE N | DELAY ANGLE 1 | SPEED 2 | $\theta_{3N+1,1}; \theta_{3N+1,2}; \theta_{3N+1,3}; \theta_{3N+1,4}; \theta_{3N+1,5}; \theta_{3N+1,6}; \theta_{3N+1,7}; \theta_{3N+1,8}; \theta_{3N+1,9}; ...; \theta_{3N+1,18}$ |
| RANGE N | DELAY ANGLE 2 | SPEED 1 | $\theta_{3N+2,1}; \theta_{3N+2,2}; \theta_{3N+2,3}; \theta_{3N+2,4}; \theta_{3N+2,5}; \theta_{3N+2,6}; \theta_{3N+2,7}; \theta_{3N+2,8}; \theta_{3N+2,9}; ...; \theta_{3N+2,18}$ |
| RANGE N | DELAY ANGLE 2 | SPEED 2 | $\theta_{3N+3,1}; \theta_{3N+3,2}; \theta_{3N+3,3}; \theta_{3N+3,4}; \theta_{3N+3,5}; \theta_{3N+3,6}; \theta_{3N+3,7}; \theta_{3N+3,8}; \theta_{3N+3,9}; ...; \theta_{3N+3,18}$ |

FIG. 3

ADAPTIVE HARMONIC REDUCTION APPARATUS AND METHODS

REFERENCE TO RELATED APPLICATION

This application is a continuation-in-part of, and claims priority to and the benefit of, U.S. patent application Ser. No. 12/894,646, filed on Sep. 30, 2010, entitled ADAPTIVE HARMONIC REDUCTION APPARATUS AND METHODS, the entirety of which application is hereby incorporated by reference.

BACKGROUND

Motor drives and other forms of power conversion systems convert electrical power from one form to another and may be employed in a variety of applications such as powering an electric motor using power converted from a single or multiphase AC input source, converting AC power from a wind driven generator to supply power to a grid, etc. Power converters may include multiple stages for different types of conversion applications, such as AC/DC/AC drives for electric motors having a pulse width modulated (PWM) active current source rectifier in which AC input power is selectively switched to create a DC output bus voltage from which a load is driven by a PWM controlled inverter stage. This type of converter is particularly useful in driving electric motors in industrial applications requiring variable speed control with varying motor load situations. Control of harmonics in such power conversion systems is a continuous challenge, particularly where an active input converter stage is used to interface with the utility grid. Conventional approaches to harmonic spectrum control include the use of predetermined rectifier firing angles for selective harmonic elimination (SHE), as well as the provision of hardware-based input filter circuits at the rectifier input. However, these techniques have thusfar provided only limited success in controlling total harmonic distortion (THD) and input filter circuits are expensive. SHE control, in this regard, only eliminates the selected harmonics, and does not allow for harmonic control. Furthermore, conventional SHE switching angle control targets only specific harmonics for reduction, and thus is insufficient for overall THD control. A continuing need therefore exists for improved motor drives and harmonic control techniques in motor drives and other switching-type power conversion systems.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure provides power converters and operating techniques employing adaptive harmonic mitigation (AHM) for operation of an active front end (AFE) converter stage to mitigate total harmonic distortion (THD) and/or to control specified input harmonics at least partially according to source harmonics and load harmonics. The described systems and methods can be advantageously implemented to provide improved harmonic control compared with conventional PWM input stage switching control schemes, such as selective harmonic elimination (SHE), etc.

Power conversion systems are provided in accordance with one or more aspects of the present disclosure, which include an active rectifier operated according to switching control signals from a PWM controller to convert AC input power to drive a DC circuit. A switching angle generator provides rectifier switching angles to the PWM controller in first and second modes. In the first mode, conventional PWM rectifier switching is provided. Selective harmonic elimination rectifier is an example for this mode and SHE switching angles are thus provided which define a quarter-wave symmetrical SHE switching pattern. In a second mode, the angle generator provides a set of AHM rectifier switching angles defining a half-wave symmetrical switching pattern which does not have quarter-wave symmetry, where the AHM switching angles are provided at least partially according to source harmonics associated with the AC input power and load harmonics associated with a load driven by the power conversion system. In certain implementations, the angle generator provides the AHM switching angles from a lookup table (LUT), and in other embodiments the AHM switching angles are computed substantially in real-time based on one or more signals or values representing source harmonics and one or more signals or values representing load harmonics. The switching angle generator in certain embodiments, moreover, generates the AHM rectifier switching angles in the second mode using a background harmonic component sample during a preceding operation in the first mode. The AHM operation of the rectifier, moreover, controls both the magnitudes and the phase angles of harmonic components of the AC input current in certain embodiments. The dual-mode operation of the switching angle generator thus facilitates control specific harmonics and/or THD reduction, with the first mode operation facilitating sampling of background harmonic measurements while using switching angles of conventional PWM, such as SHE, to be used in subsequent AHM operation in the second mode. In certain embodiments, moreover, the AHM switching angles are provided in the second mode by calculating a background harmonic component without reference to any measurement of a source voltage received by the rectifier.

Further aspects of the disclosure provide an active front end power converter with a switching angle generator providing AHM rectifier switching angles based on source and load harmonics, where the switching angles are provided in discrete steps using a measured line current $h^{th}$ harmonic component associated with the AC input in a given current step and a switching pattern $h^{th}$ harmonic component associated with switching operation of the active rectifier in an immediately preceding step.

In some implementations, the AHM rectifier switching angles are generated based on the source voltage and its harmonic components that are estimated or calculated by using the measured line current and converter input voltage without measuring the actual source voltage. With a certain converter input circuit, the required signals for the background harmonic component for AHM rectifier switching angle generation can be estimated or calculated based on some other signals of the circuit, or can be measured directly.

Methods and computer readable mediums are provided with computer executable instructions for operating an active rectifier of a power conversion system in accordance with further aspects of the peasant disclosure. The methods and computer instructions involve providing rectifier switching control signals according to a set of switching angles, and providing the rectifier switching angles in first and second modes. In the first mode, the switching angles are provided as a set of conventional PWM angles. For example, the switching angles are provided as a set of SHE angles defining a quarter-wave symmetrical switching pattern, and a set of AHM rectifier switching angles are provided in the second mode which define a half-wave symmetrical switching pattern based on source and load harmonics, where the switching pattern of the AHM switching angles does not have quarter-wave symmetry.

Other aspects of the disclosure involve methods and computer readable mediums with instructions for active rectifier operation, in which AHM rectifier switching angles are provided in discrete steps using a measured line current $h^{th}$ harmonic component associated with AC current received by the rectifier in a given current step, and a switching pattern $h^{th}$ harmonic component associated with switching operation of the active rectifier in an immediately preceding step.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 3 is an exemplary switching angle set table in the rectifier controller of FIG. 1 with firing angle sets corresponding to various harmonic condition ranges;

DETAILED DESCRIPTION

Figure 1:
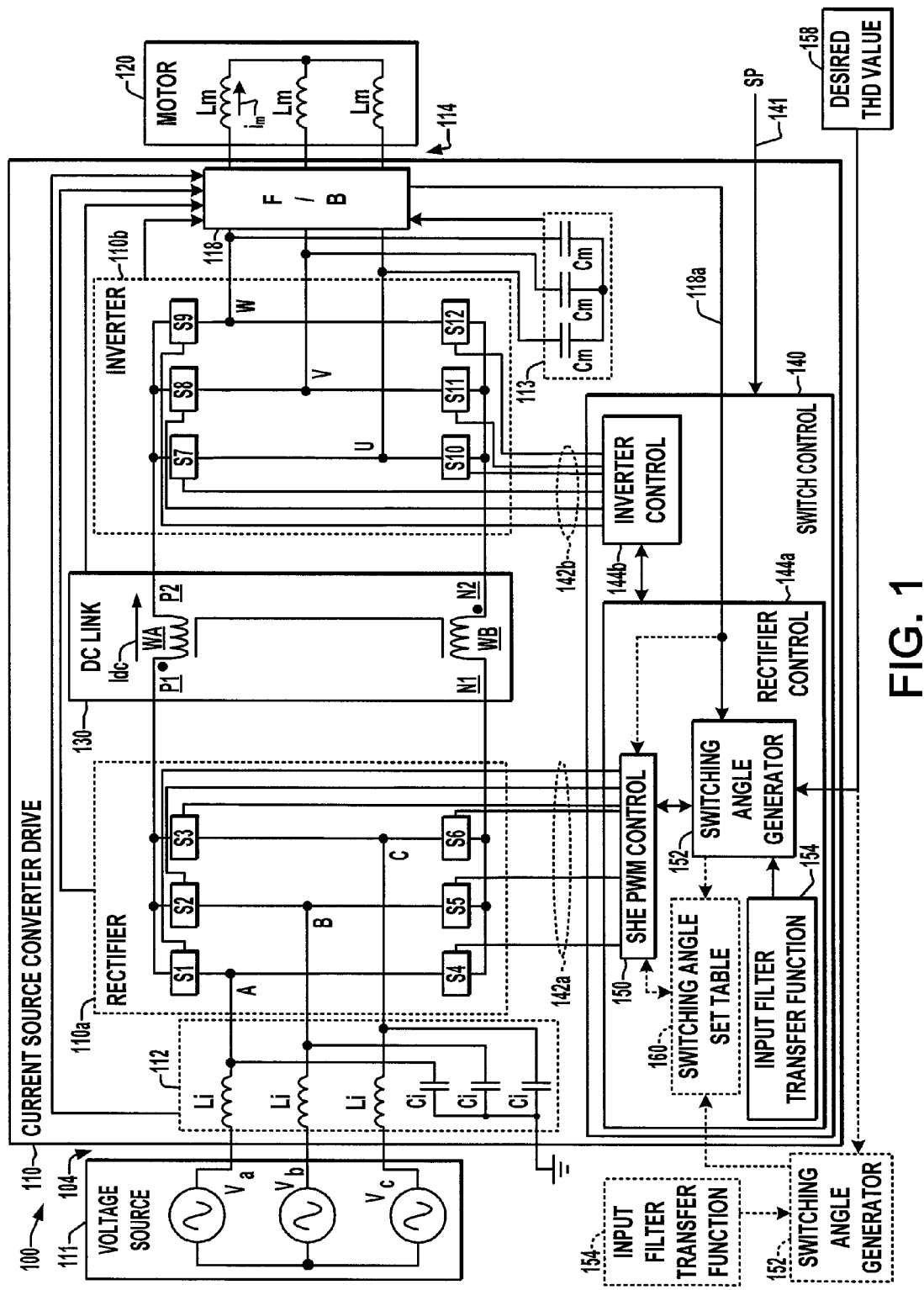
FIG. 1 is a schematic diagram illustrating an exemplary current source converter type variable frequency motor drive with adaptive harmonic elimination PWM switching control for an active rectifier in accordance with one or more aspects of the present disclosure.

Several embodiments or implementations are hereinafter described in conjunction with the drawings, wherein like reference numerals are used to refer to like elements throughout, and wherein the various features are not necessarily drawn to scale.

Power converters are disclosed along with rectifier PWM control systems and methods in which firing or switching angles are computed in real time or are predetermined and stored in a table for selection according to harmonic conditions at the converter input. The PWM switching control of the rectifier is done in a manner that provides for selective elimination or reduction or control of one or more particular harmonics, and also controls total harmonic distortion (THD) in a harmonic range of interest, with these goals being tailored to specific source harmonic conditions. These aspects alone or in combination provide significant advances over conventional pulse width control techniques, particularly in combination with hardware-based input line filter circuitry to provide DC power for driving an output inverter while controlling the line harmonic content. The inventors have appreciated that conventional programmed switching pattern techniques such as space vector modulation (SVM), sinusoidal PWM (SPWM), Trapezoidal PWM (TPWM), or selective harmonic elimination (SHE) typically employ a set of switching angles to fire semiconductor-based power switching devices of an input rectifier.

The conventional PWM is used at the converter's AFE to reduce the line harmonics of a converter system. For example, the goal of SHE approaches is to control the frequency content or spectrum to ideally eliminate certain harmonics (e.g., such as $5^{th}$, $7^{th}$, etc.), with higher-order harmonics being suppressed by adding a low-pass filter to the input. The physical size of the filter circuit components is determined by the hardware filter resonant frequency, which in turn is determined by the PWM spectrum. For example, the resonant frequency of an input filter used in conjunction with a 7-pulse SHE pattern is typically lower than 5 pu for controlling higher-order harmonics. The filter resonant frequency is set by the inductance and capacitance of the filter, with lower resonant frequencies corresponding to larger inductances and capacitances and accordingly to higher cost and larger size. Increased filter capacitance additionally causes leading power factor, which is undesired in most applications. For an SHE implementation, the switching angles have previously been calculated by solving equation systems derived from Fourier analysis, where certain harmonics are ideally eliminated by forcing some harmonics to be zero in the equation set. In the conventional approach, however, the equations are constructed assuming an ideal DC link and a harmonic-free source, without consideration of the hardware filter characteristics. The hardware filter is designed afterwards according to the spectrum generated by the computed SHE firing angles, with the filter tuning point generally lower than 5 pu.

Referring initially to FIG. 1, an exemplary power conversion system 100 is illustrated, which includes a current source converter (CSC) type motor drive 110 driving a motor load 120. While illustrated in connection with a current source type converter 110 with an LF input filter 112 and a C output filter 113, other embodiments are possible using a voltage source type converter 110 with a CL or LCL input filter 112 and with or without an LC output filter 113. In certain embodiments, the conversion system 100 includes a current source rectifier and an intermediate circuit having one or more inductances. In certain embodiments, the power conversion 100 system is a distributed power generation system in which the rectifier is a grid-tie current source converter and the intermediate circuit includes at least one inductance, or the rectifier may be a 2-level or multilevel grid-tie voltage source converter and the intermediate circuit includes at least one capacitance.

The drive 110 includes a rectifier 110a with an AC input circuit 104 including a rectifier input filter 112 coupled with a three-phase AC voltage source 111 providing input power to the drive 110, and the drive 110 converts the input power to provide motor current $i_m$ to drive a motor load 120 having phase windings with associated inductances Lm coupled to a converter output 114. The drive 110 is a current source converter (CSC) type, with a filter circuit 112 connected to the AC power source 111. While these examples are illustrated as having a three phase input 104, other embodiments may provide a single phase AC input or may include a multiphase input adapted to receive three or more input phases. The CSC drive 110 in FIG. 1 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases, and may power a load other than a motor, such as a power grid in a wind energy system, for example. The illustrated motor drive 110 includes both input filter capacitors Ci in the input filter 112, as well as output filter capacitors Cm in an output filter circuit 113. The input filter capacitors Ci are coupled between corresponding input phase lines A, B, and C and an input neutral node. The output capacitors Cm are individually coupled between a corresponding output phase line U, V, and W and an output neutral node. Certain embodiments may omit either or both of the input or output filter capacitor sets. The input and output neutral nodes may be floating in certain embodiments, or one or both of the neutrals may be coupled to the ground of the input power source or to another ground. In still other possible embodiments, the neutrals may be coupled to one another directly or through an impedance without reference to any system ground. In the illustrated example, the node is grounded.

The drive 110 includes a rectifier 110a receiving the AC input power from the source 111 via an input 112, as well as an intermediate DC circuit 130 with a DC link inductance (link choke) having upper and lower windings WA and WB coupled between the rectifier 110a and an output inverter 110b. In certain embodiments, the DC link could be a simple DC link inductor or a common mode choke with windings in each of the upper and lower DC current paths as in the illustrated example. In other embodiments, a single link inductor could be provided in only one of the upper and lower Dc current paths. In still other embodiments, the drive 110 could be a voltage source converter drive with an intermediate DC bus voltage established in the circuit 130, with a capacitance (single or multiple capacitors) connected between the upper and lower DC branches. The illustrated drive 110 provides input filtering including inductors Li in each input phase and input filter capacitors Ci coupled between the input lines A, B, C, and the input neutral node. The rectifier 110a is a current source rectifier (CSR) coupled with a current source inverter (CSI) 110b by the intermediate DC circuit 130, and one or more isolation components (e.g., transformers, not shown) may optionally be included in the drive 110. The output 114 provides AC electrical output power to the motor load 120 via lines U, V, and W, and includes filter circuit 113 with the output capacitors Cm coupled between the load 120 and the output neutral node.

The rectifier 110a is an active switching-type current source rectifier (CSR) with switching devices S1-S6 coupled between the input 112 and the DC circuit 130 and operates according to a plurality of rectifier switching control signals 142a provided by a rectifier control component 144a of a switch control system 140. In operation, the AC input power is switched by the rectifier switches S1-S6 to create an intermediate DC link current Idc in the intermediate circuit 130. The exemplary inverter 110b is a current source inverter (CSI) that includes switching devices S7-S12 coupled between the DC circuit 130 and phase lines U, V, and W of the output 114. The inverter switches S7-S12 are operated according to corresponding switching control signals 142b from an inverter control component 144b of the switch control system 140 to selectively convert DC power from the DC circuit 130 to provide the AC output power to drive the motor load 120.

In the intermediate DC (link) circuit 130, the DC link choke or inductor links the switches of the rectifier 110a and the inverter 110b, and provides forward and return current paths therebetween. The first winding WA of the link choke is coupled in a forward or positive DC path and has a first end P1 connected to the upper rectifier switches S1-S3 and a second end P2 coupled with the upper inverter switches S7-S9. The second (lower) winding WB is coupled in a negative or return DC path and has a first end N1 coupled to the lower rectifier switches S4-S6 as well as a second end N2 coupled to the lower inverter switches S10-S12.

The rectifier and inverter switching devices S1-S12 may be any suitable controllable electrical switch types (e.g., SGCTs, IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S7-S12 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices could be used for the inverter switching devices S7-S12 in the form of forced commutated devices with extra circuitry added to the device triggering circuit thereof.

The rectifier 110a and the inverter 110b operate under control of the switch control system 140, which may include one or more processors and associated memory as well as I/O circuits including driver circuitry for generating switching control signals 142 to selectively actuate the switching devices S1-S12 although separate switching control systems may be employed, for example, with interconnections and information sharing to facilitate the coordinated operation of the rectifier 110a and the inverter 110b. The switch control system 140 in these embodiments includes an inverter control component 144b providing the inverter switching control signals 142b to cause the inverter 110b to selectively convert DC current from the intermediate DC circuit 130 to provide AC electrical power to the AC output 114 according to one or more setpoints 141, such as desired motor speed, torque, etc. The switch control system 140 and the components 144 thereof can be implemented as any suitable hardware, processor-executed software, processor-executed firmware, programmable logic, or combinations thereof, operative as any suitable controller or regulator by which the motor 120 is controlled according to one or more desired profile(s) or setpoint(s) 141, whether signals and/or digital values, in open or closed-loop fashion or combinations thereof.

In operation, moreover, a rectifier control component 144a of the controller 140 provides the rectifier switching control signals 142a to cause the rectifier 110a to convert AC electrical input power to provide a regulated DC current Idc to the DC circuit 130. In doing so, the rectifier controller 144a may employ one or more feedback signals or values 118a, such as a measured DC current value from the rectifier 110a representing the actual DC link current Idc and/or DC link voltage. The DC link current Idc from the rectifier 110a provides input current for conversion by the inverter 110b, where the exemplary inverter control 144b may provide a desired DC link current signal or value as a regulation setpoint to the rectifier controller 144a. In this manner, the rectifier 110a provides the DC current required by the inverter 110b, and the rectifier controller 144a may also implement other control functions such as power factor correction, while the inverter controller 144b performs the necessary motor control operation of the drive 110 according to one or more setpoint values or signals 141.

The drive 110 also includes a feedback system 118 including one or more sensing elements operative to provide one or more feedback signals and/or values 118a indicative of electrical conditions at the input 112, the rectifier 110a, the intermediate DC circuit 130, the inverter 110b, the output filter 113, and/or at the output 114. The switch control system 140 may be provided with one or more setpoints or desired values 141 and one or more feedback signals or values 118a from the feedback system 118 by which one or more closed loop motor drive control goals are achieved in normal motor drive operation. Feedback signals or values for the control functions can be based on signals and/or values 118a from the feedback system 118, measured input values (e.g., line voltages, currents, neutral voltages, currents, etc.), and other information, data, etc., which may be in any suitable form such as an electrical signal, digital data, etc., and which may be received from any suitable source, such as one or more sensors, an external network, switches, a user interface associated with the system 100, or other suitable source(s). The feedback circuit 118 provides feedback signal(s) or value(s) to the controller 140 from at least one of the rectifier 110a, the DC circuit 130, and the inverter 110b, and may provide measured motor speed values through appropriate tachometers or other sensors, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

Figure 2:
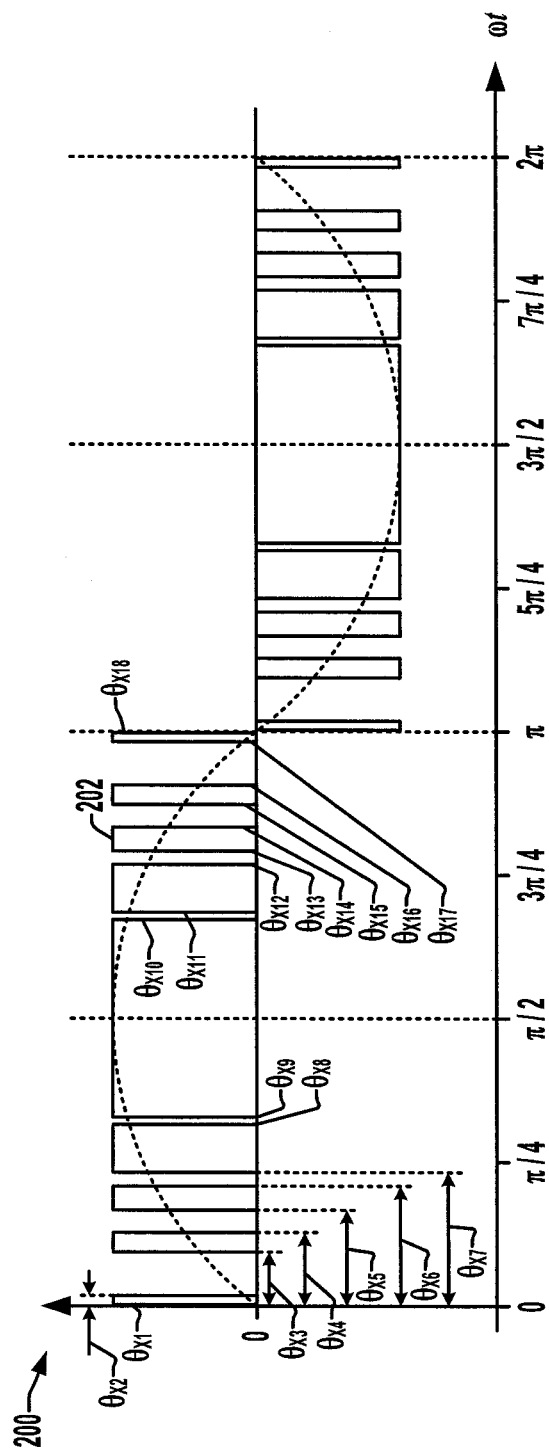
FIG. 2 is a plot showing an exemplary PWM switching pattern used in the rectifier of FIG. 1 with various switching angles determined according to the various techniques of the present disclosure for selectively eliminating or reducing certain harmonics and for controlling THD.

Referring also to FIG. 2, the rectifier controller 144a includes a PWM controller 150 that provides pulse width modulated rectifier switching control signals 142a to the switches S1-S6 of the rectifier 110a according to a set of rectifier switching angles. FIG. 2 provides a graph 200 illustrating an exemplary 9-pulse adaptive SHE PWM (AHM) switching pattern 202 used in the rectifier controller 144b of FIG. 1 with various switching angles (including angles $\theta_{X,1}$-$\theta_{X,18}$ from a table 160 or from a real-time angle generator 152) in controlling the actuation of the rectifier switches S1-S6 in order to cause the rectifier 110a to convert AC electrical input power to provide regulated DC power to the intermediate DC circuit 130. In the illustrated 9-pulse implementation, the PWM controller provides the pulse pattern for selective connection of the input terminals to the DC conduction paths of the intermediate circuit 130 in both half-cycles of the AC input periods (e.g., AC source 111 provides sinusoidal input power at 60 Hz shown in dashed line in FIG. 2 in one example), with the switching angles $\theta_{X,1}$-$\theta_{X,18}$ being taken directly from the switching angle set. Although 9-pulse pattern is used to elaborate the principle, the actual number of pulses is not limited to nine.

As further shown in FIG. 1, in certain embodiments, the controller 144a includes a switching angle generator 152 that computes the switching angles substantially in real time based at least in part on one or more signals or values 118a indicative of source harmonics at the AC input 112 of the rectifier 110a and on a transfer function 154 of the rectifier input filter 112. The angle generator 152 in certain embodiments computes the set of rectifier switching angles substantially in real time based at least partially on the signals in feedback 118a containing the information of the source harmonics, on at least one harmonic to be reduced or eliminated, and on a desired THD value 158, which may be predetermined and stored in the switch control system 140 or which may be obtained as a signal or value from an external source.

Referring also to FIG. 3, in other embodiments, the rectifier controller 144a includes a switching angle set table 160 storing a plurality of sets of rectifier switching angles $\theta_{X,1}$-$\theta_{X,18}$, which can be stored in a memory of the controller 144a or elsewhere in the converter 110, or which may be stored in a separate system accessible by the PWM controller 150. FIG. 3 shows an exemplary angle set table 160 with firing angle sets corresponding to an integer number N source harmonic condition ranges. The table entries 160 also account for one or more other variables that the PWM controller 150 uses in selecting a particular angle set $\theta_{X,1}$-$\theta_{X,18}$. For example, the illustrated table 160 is divided into N portions, each having angle sets $\theta_{X,1}$-$\theta_{X,18}$ corresponding to one of N ranges of harmonic conditions at the AC input 112 (e.g., as measured by the feedback system 118 or as determined by separate measurements or estimations), for instance, in terms of one or more specific harmonics and/or total harmonic distortion of a given harmonic range (e.g., $2^{nd}$ through $40^{th}$ harmonic). In this example, each portion includes further divisions for particular rectifier delay angles and motor speeds. In operation, the PWM controller 150 receives feedback information 118a from the feedback system regarding the significant source harmonics at the current time, as well as rectifier delay angle and current motor speed, and uses these to index the table 160 to obtain the appropriate switching angle set $\theta_{X,1}$-$\theta_{X,18}$. The entries of the table 160 can be computed via an included angle generator 152 using input harmonic measurements 118a obtained from the feedback system 118 or may be computed separately from the converter 110 by an external switching angle generator 152 using the input filter transfer function 154, the desired THD value 158 and information regarding input source harmonic conditions, with the resulting sets of switching angles $\theta_{X,1}$-$\theta_{X,18}$ being provided to the converter 110 for storage in the table 160.

In operation, the PWM controller 150 receives the set of rectifier switching angles $\theta_{X,1}$-$\theta_{X,18}$ from the switching angle generator 152 or from the table 160 and generates the pulse width modulated rectifier switching control signals 142a as a series of pulses 200 (e.g., FIG. 2) accordingly so as to cause the rectifier 110a to convert AC electrical input power to provide regulated DC power to the intermediate DC circuit 130.

Figure 4:
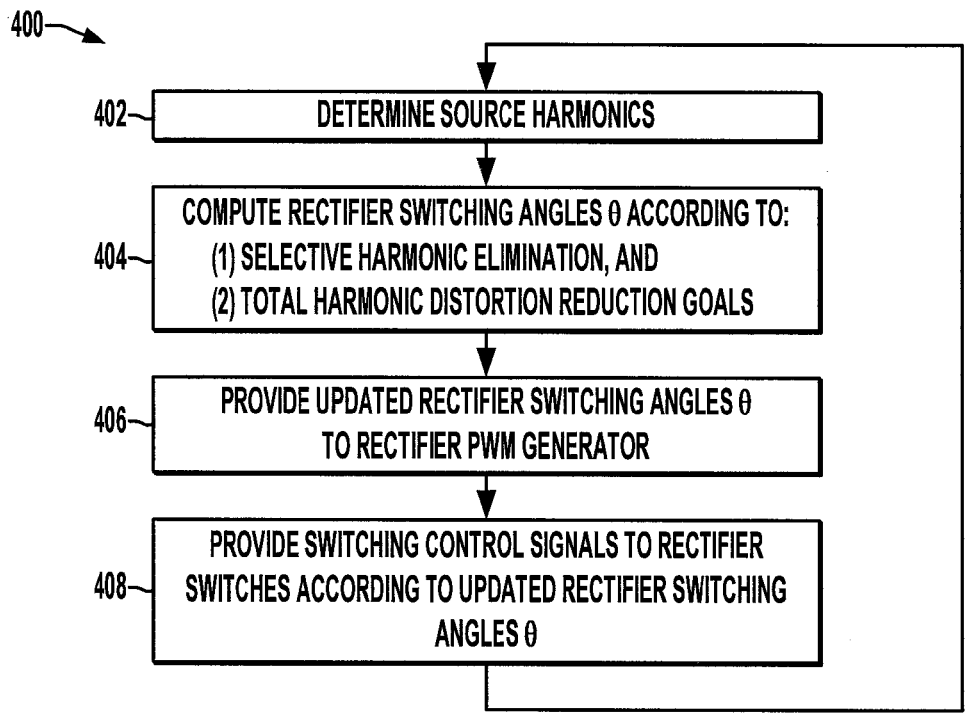
FIG. 4 is a flow diagram illustrating an exemplary method for rectifier PWM control including real-time switching angle computation in accordance with the disclosure.

Referring also to FIG. 4, an exemplary process 400 is illustrated for rectifier PWM control including real-time switching angle computation in accordance with the disclosure. Although the exemplary method 400 and other methods of the disclosure are illustrated and described below as a series of acts or events, the disclosure is not limited by the illustrated ordering of such acts or events. For example, some acts may occur in different orders and/or concurrently with other acts or events apart from those illustrated and/or described herein, and not all illustrated steps may be required to implement a process in accordance with the disclosure. Further, the methods may be implemented in association with the above described rectifier controller 144a as well as in association with other systems not illustrated. At 402, the switching angle generator 152 of the controller 144a determines source harmonics, for example, according to one or more feedback signals or values 118a, and computes a set of rectifier switching angles $\theta_{X,1}$-$\theta_{X,9}$ at 404 according to elimination of select harmonics (e.g., $5^{th}$, $7^{th}$ etc.) and according to the desired THD value 158, for instance, to maintain the total harmonic distortion corresponding to a range of harmonics of interest at or below a certain threshold (desired maximum) limit 158. At 406, the angle generator 152 provides the set of rectifier switching angles $\theta_{X,1}$-$\theta_{X,18}$ to the rectifier PWM controller 150. The PWM controller 150 provides updated switching control signals 142a to the rectifier switches S1-S6 at 408 according to the updated set of rectifier switching angles $\theta_{X,1}$-$\theta_{X,18}$ to operate the rectifier 110a.

Figure 5:
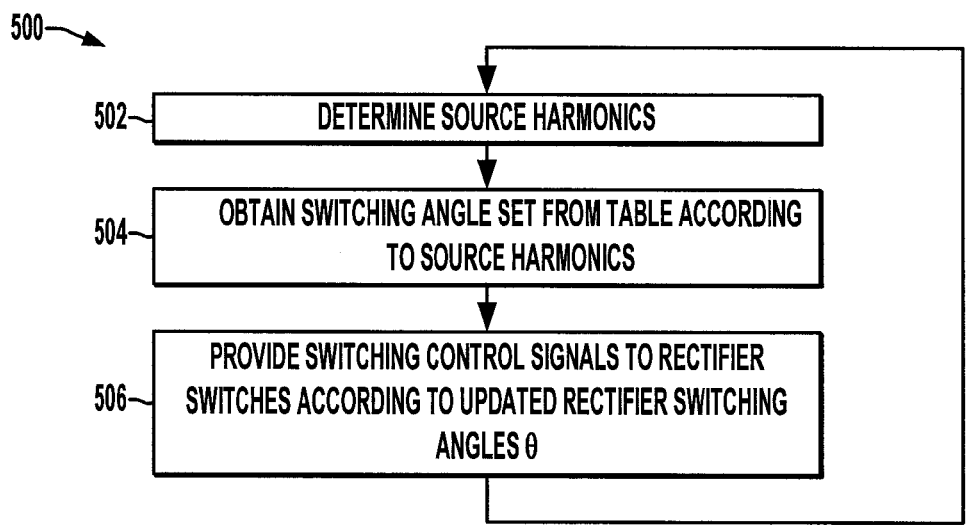
FIG. 5 is a flow diagram illustrating an exemplary method for rectifier PWM control using switching angles obtained from a table according to source harmonic conditions in accordance with the disclosure.

FIG. 5 illustrates another exemplary process 500 in which sets of switching angles are obtained from a table 160 according to source harmonic conditions. At 502, the PWM controller 150 determines the source harmonics, for example, according to one or more feedback signals or values 118a. The source harmonic conditions are used at 504 to obtain a corresponding switching angle set $\theta_{X,1}$-$\theta_{X,18}$ from the angle set table 160. At 506, the PWM controller 150 provides pulse width modulated rectifier switching control signals 142a to the rectifier 110a according to the selected set of rectifier switching angles $\theta_{X,1}$-$\theta_{X,18}$ to cause the rectifier 110a to convert AC electrical input power to provide regulated DC power to the intermediate DC circuit 130.

Figure 6:
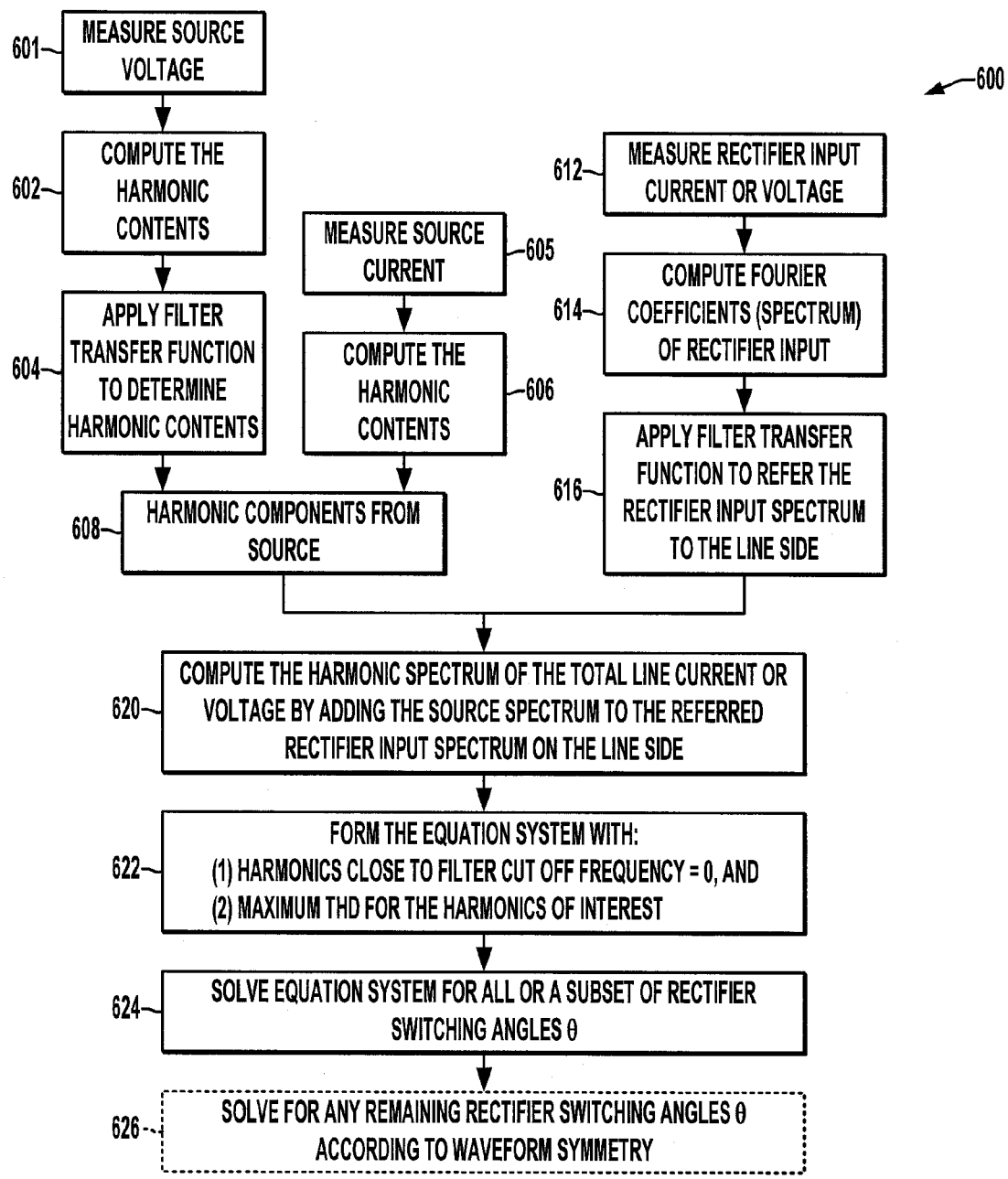
FIG. 6 is a flow diagram illustrating an exemplary method of computing rectifier switching angles in accordance with the disclosure.
Figure 7:
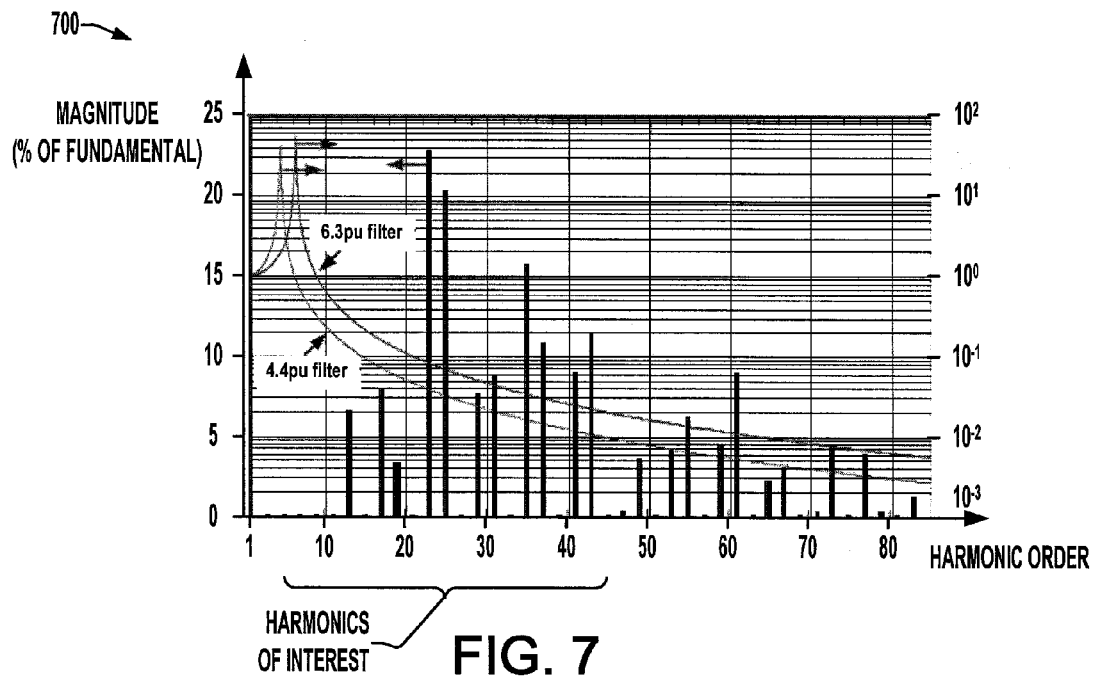
FIGS. 7 and 8 are graphs illustrating exemplary spectrums obtained from conventional and adaptive SHE techniques, respectively.
Figure 8:
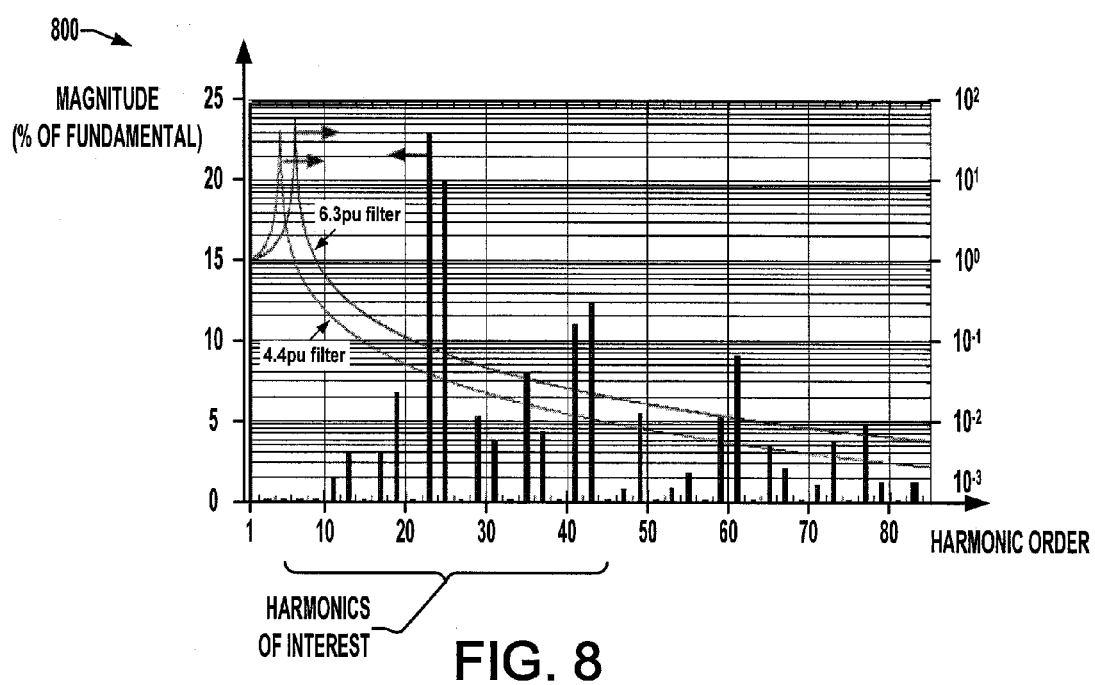

Referring also to FIGS. 6-8, the disclosure further provides methods for computing a set of rectifier switching angles $\theta_{X,1}$-$\theta_{X,18}$ for generating pulse width modulated rectifier switching control signals 142a using adaptive harmonic elimination in a power conversion system 110. FIG. 6 illustrates an exemplary process 600 for computing rectifier switching angles in accordance with the disclosure, and FIGS. 7 and 8 show exemplary spectrums obtained from conventional and adaptive SHE techniques, respectively. These techniques can be employed in real-time or substantial real-time using the integrated switching angle generator 152 described above, and/or the processes may be implemented in external systems in real-time or off-line, for instance, to generate switch angle set entries for storage in the controller table 160 in FIG. 1. The adaptive SHE approaches outlined herein involve formation and solution of an equation system based in whole or in part on the current or voltage spectrum of the power conversion system, one or more harmonics to be reduced or eliminated, and a minimized THD value.

The techniques can be used to implement an overall harmonic minimization strategy (Ohms) to facilitate reduction in THD, and advantageously takes into account the characteristics (e.g., transfer function) of the AC input filter 112. Thus, while conventional SHE techniques may not completely eliminate specific harmonics in practice due to the effects of source harmonic conditions and/or the effects of the input filter, the Ohms approach factors these effects into the computation of the switching angle sets $\theta_{X,1}$-$\theta_{X,18}$. Certain implementations begin with a Fast Fourier Transform (FFT) to obtain the expressions of harmonic components. The signal spectrum is then obtained by modifying the harmonic components according to the transfer function 154 of the input filter 112 to obtain a weighted spectrum, and the THD can be recalculated for minimization for the filtered signal. The process of minimization may or may not be coupled with extra constraints, such as a set of maxima for some critical harmonics for selected filter 112.

FIG. 7 shows a spectrum 700 of an SHE controlled rectifier adapted for 9-pulse operation in which the $5^{th}$, $7^{th}$, and $11^{th}$ harmonics are eliminated while higher-order harmonics have significant amplitudes not addressed by the SHE switching pattern. For these, an input filter 112 (low-pass) may be used, however, the filter tuning point must be low enough to effectively suppress the higher-order harmonics. FIG. 7 further illustrates transfer functions of two exemplary second-order input filters 112 having resonant frequencies of 4.4 pu and 6.3 pu, respectively. As seen in FIG. 7, the 6.3 pu filter has higher gain (around twice the gain of 4.4 pu filter) for the higher order harmonics, and simulation of this example shows the THD is higher than 5% for the 6.3 pu filter because of insufficient attenuation for higher order harmonics. At the same time, however, the 4.4 pu filter can be used for the desired THD at the price of larger and more expensive inductance and capacitance components. Moreover, the existing SHE approach does not take existing source harmonics into consideration, and the inventors have appreciated that source harmonics can adversely impact the line current THD after filtering.

FIG. 8 shows the filter waveforms and spectrum 800 of an exemplary 9-pulse pattern obtained via the Ohms technique in which the equation set is modified to force the THD over a range of harmonics of interest (e.g., $2^{nd}$ through $40^{th}$ in the illustrated example) to be at or below a desired THD threshold limit value 158, while still attempting to eliminate or reduce the $5^{th}$, $7^{th}$, and $11^{th}$ harmonics. In this manner, the Ohms technique controls the overall harmonic condition beyond the capabilities of conventional SHE approaches, and may further factor in the transfer function characteristics of the input filter 112. As seen in the example of FIG. 8, the $11^{th}$ harmonic is no longer completely eliminated, but the $13^{th}$ thru $19^{th}$ harmonics are reduced, whereby the total harmonic distortion in the range of interest is reduced. This pattern enables the use of a 6.3 pu line input filter 112 while achieving a THD of 5% or less. The 6.3 pu filter, in turn, needs only about half of the capacitance compared to a 4.4 pu filter, and thus the Ohms technique facilitates reduction in power conversion system cost and size.

The adaptive SHE techniques of the present invention can be implemented by substantially real-time computation of switching angle sets based on feedback of source harmonic conditions 118a, and it is also possible to calculate a subset of independent angles to obtain a set of angles $\theta_{X,1}$-$\theta_{X,18}$ for different source harmonics scenarios as shown in the table 160 in FIG. 3 above for intelligent selection according to source harmonics. The angle calculation in certain embodiments includes solving an equation set for all or a subset of firing angles, with any remaining angles (e.g., the non-independent angles) being obtained by calculations based on waveform symmetry. Examples of factors that can possibly affect the switching angles include preexisting harmonics that are significant to the filter, line filter resonant frequency, rectifier firing angles, DC current or voltage, and motor speed. Since the input filter 112 is most sensitive to the harmonics close to its tuning frequency, the preexisting harmonics that are calculated in certain implementations are those having the most significant filter gain. These techniques can be advantageously used for grid-tie PWM converters to improve the THD performance and are applicable to both current source and voltage source PWM converters.

Referring also to FIG. 6, the rectifier controller 144a employs selective harmonic elimination (SHE) type control component 150 in generating the switching control signals 142a. This technique effectively controls the PWM switching points in the output waveform to be at specific angles for control of harmonics and total harmonic distortion (THD). FIG. 6 illustrates an exemplary method 600 of computing a set of rectifier switching angles $\theta_{X,1}$-$\theta_{X,18}$ for generating pulse width modulated rectifier switching control signals 142a in a power conversion system 110. The process 600 can be used in real-time (e.g., in the on-board angle generator 152) or off-line. In general, the technique 600 involves forming an equation system (e.g., at 622) based at least partially on the current spectrum considering both harmonics from the rectifier and harmonics from the source, one or more harmonics to be reduced or eliminated, and a desired THD value 158, and solving the equation system (e.g., at 624) to obtain the set of rectifier switching angles $\theta_{X,1}$-$\theta_{X,18}$. In certain embodiments, an equation set is solved for a subset of the angles (e.g., independent angles $\theta_{X,1}$-$\theta_{X,9}$ in the example of FIG. 2) with any remaining angles (e.g., dependent angles $\theta_{X,10}$-$\theta_{X,18}$) being solved at 626 based on symmetry of the waveform 200 (FIG. 2).

In the embodiment of FIG. 6, the source voltage can be measured at 601 (e.g., via the feedback system 118) and the harmonic contents of interest are computed at 602, with the input filter transfer function 154 being applied at 604 to determine the line current, or the line current can be instead directly measured at 605 (e.g., via the feedback system 118) with the harmonic contents being computed at 606. The critical harmonics are calculated for the line current at 608, for example, a line current spectrum is obtained for the critical harmonic components including the fundamental current, according to the measured or determined line current. Also, the rectifier DC current (e.g., Idc in FIG. 1) or voltage is measured at 612 (e.g., via the feedback system 118) and a rectifier input current or voltage spectrum is computed at 614 (e.g., Fourier coefficients) according to the measured DC rectifier current or voltage. At 616 the input filter transfer function 154 is applied to the rectifier input current or voltage spectrum in order to refer the rectifier input current or voltage spectrum to the line side and thereby to obtain a referred or weighted rectifier input current or voltage spectrum. At 620, a total line current or voltage spectrum is computed as the sum of the line current or voltage spectrum and the referred rectifier input current or voltage spectrum. At 622, the equation system is formed based at least partially on the total line current or voltage spectrum, with application of various control constraints, such as forcing one or more harmonics of interest (e.g., $3^{rd}$, $5^{th}$, $11^{th}$, or others close to the input filter tuning point) set to zero or some other maximum value, and with a total harmonic distortion value for a given range of interest (e.g., as shown in FIGS. 7 and 8 above). The equation system is then solved at 624 to yield a subset of independent angles for the set of rectifier switching angles $\theta_{X,1}$-$\theta_{X,18}$ for use in controlling the PWM operation of the switching rectifier 110a. Non-independent angles can be obtained by using waveform symmetry at 626.

The following discussion further illustrates computational aspects of the process 600. Assuming a constant DC link (voltage or current) and an odd function $y_{pwm}$, any PWM waveform can be expressed in Fourier series:

$$y_{pwm} = \sum_{n=1}^{\infty} a_n \sin n\omega t, \tag{1}$$

where $y_{pwm}$ represents rectifier input current for CSC, or rectifier input voltage for VSC, $a_n$ is the Fourier coefficient and can be calculated as:

$$a_n = \frac{1}{\pi} \int_0^{2\pi} y_{pwm} \sin n\omega t \, d(\omega t), \tag{2}$$

which are functions of independent switching angles defining the PWM waveform. In traditional SHE, certain equation systems are obtained by forcing the Fourier coefficients to be equal to specific values. For instance, if the $5^{th}$ and $7^{th}$ harmonics are to be eliminated, $a_5$ and $a_7$ will be forced to be zero and $a_1$ will be forced to the value ma of the amplitude modulation index of the fundamental component. An integer number k independent angles are generally needed to define k independent equations, for example, with three unknown angles $\beta_1$, $\beta_2$ and $\beta_3$, three equations can be obtained to define modulation index, and eliminate $5^{th}$ and $7^{th}$ harmonics:

$$\begin{cases} a_1(\beta_1, \beta_2, \beta_3) = m_a \\ a_5(\beta_1, \beta_2, \beta_3) = 0 \\ a_7(\beta_1, \beta_2, \beta_3) = 0, \end{cases} \quad (3)$$

or to eliminate three harmonics (e.g., $5^{th}$, $7^{th}$ and $11^{th}$) with fixed modulation index:

$$\begin{cases} a_5(\beta_1, \beta_2, \beta_3) = 0 \\ a_7(\beta_1, \beta_2, \beta_3) = 0 \\ a_{11}(\beta_1, \beta_2, \beta_3) = 0 \end{cases} \quad (4)$$

These equations can be solved for switching angles $\beta_1$, $\beta_2$ and $\beta_3$.

In the adaptive SHE and Ohms techniques of the present disclosure, one or more additional conditions are considered, including without limitation existing source harmonics and harmonics caused by the rectifier. When looking into the filter 112 from the power system, the transfer function of the filter is $h_1(n\omega)$, and the line current harmonics caused by the source harmonics are:

$$i_{src} = \sum_{n=1}^{\infty} h_1(n\omega) V_n \sin(n\omega t + \varphi_n). \quad (5)$$

Regarding the harmonics caused by the rectifier, when looking into the filter 112 from the rectifier, the transfer function of the filter is $h_2(n\omega)$. The harmonics in the line current caused by PWM waveform can be expressed as:

$$i_{line,pwm} = h_2 y_{pwm} \quad (6)$$

$$= \sum_{n=1}^{\infty} h_2(n\omega) a_n \sin(n\omega t + \phi_n).$$

The overall line current is the sum of:

$$i_{line} = i_{scr} + i_{line,pwm} \quad (7)$$

$$= \sum_{n=1}^{\infty} [h_1(n\omega) V_n \sin(n\omega t + \varphi_n) + h_2(n\omega) a_n \sin(n\omega t + \phi_n)],$$

$$= \sum_{n=1}^{\infty} (a'_n \sin(n\omega t) + b'_n \cos(n\omega t))$$

where:

$$a'_n = h_1(n\omega) V_n \cos\varphi_n + h_2(n\omega) a_n \cos\phi_n$$

$$b'_n = h_1(n\omega) V_n \sin\varphi_n + h_2(n\omega) a_n \sin\phi_n.$$

$$c'_n = \sqrt{a'^2_n + b'^2_n}. \quad (8)$$

For overall harmonic minimization (Ohms), assuming there are 4 independent angles, $5^{th}$, $7^{th}$ and $11^{th}$ to be eliminated, as well as a THD to be minimized/reduced, the equation system will be given as follows:

$$\begin{cases} a'_5 = b'_5 = 0 \\ a'_7 = b'_7 = 0 \\ a'_{11} = b'_{11} = 0 \\ \sum_{n=2}^{k} (c'_n / c'_1)^2 \leq THD_0^2, \end{cases} \quad (9)$$

where k is the order of harmonics of interest, $THD_0$ is the allowable total harmonic distortion value 158 (e.g., set according to related standards or other user requirements). The angle generator 152 (real-time or off-line) can then solve the above equation (9) to yield a set of angles $\theta_{X,1}$-$\theta_{X,4}$ for use in controlling the rectifier 110a.

Figure 9:
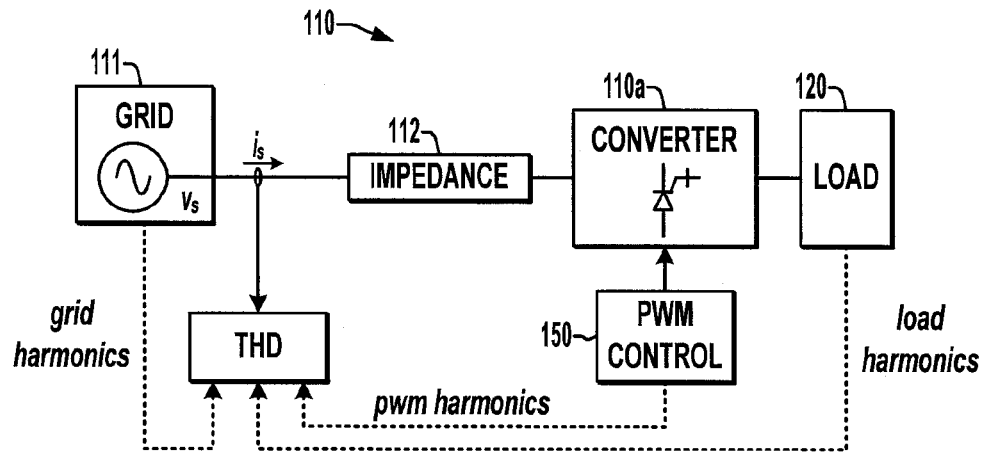
FIG. 9 is a schematic diagram illustrating source (grid), load and PWM switching harmonic sources in a grid-interfacing power conversion system.

Referring also to FIG. 9, harmonic control in power conversion systems is a continuous challenge, particularly where an Active Front End (AFE) (e.g., rectifier 110a in FIG. 9) is used to interface with the utility grid 111 via an impedance 112 such as an input filter circuit. In accordance with further aspects of the present disclosure, Adaptive Harmonic Mitigation (AHM) is employed in operation of the AFE 110a to provide improved harmonic reduction and/or THD control with respect to harmonics at the input of a grid-interfacing power conversion system 110. Conventional PWM techniques attempt to minimize the harmonics in the PWM current, for example, SHE schemes eliminate selected harmonics in the PWM pattern in order to optimize the PWM current harmonic performance. AHM does not require a higher switching frequency but can regulate both the magnitudes and phase angles of the selected harmonics, and can therefore facilitate improvement and/or optimization of the line current $i_s$ by compensating the background harmonics including harmonics related to the source as well as load harmonics. With the AHM, the grid-interfacing PWM converters or DC power supplies can operate as an active power filter (APF) with a very low switching frequency. As further described below, the AHM techniques can be used with substantial real-time computation of rectifier switching angles and/or with lookup table (LUT) implementations, and the switching control system 140 (FIG. 1) or a rectifier control component 144a thereof can implement the disclosed AHM switching angle generation concepts in continuous fashion or in a dual-mode operation by alternating between conventional PWM such as SHE and AHM angle generation. Moreover, the AHM operation can be done for specific line current harmonic optimization (e.g., targeted harmonics are reduced) alone or in combination with total harmonic distortion (THD) reduction.

FIG. 9 illustrates harmonic sources in a grid-interfacing power conversion system 110 having an active front end converter (e.g., rectifier) 110a. In this system 110, the THD of the line (source) current $i_s$ reflects the harmonic performance of the converter system 110. A typical grid-interfacing PWM converter normally has two independent harmonic sources, the grid and the PWM switching. Another harmonic source that contributes to the line current THD is the converter's load circuit, which is also affected by the grid and PWM. The relationship diagram of the harmonic sources in a grid-interfacing converter system is shown in FIG. 9. Therefore, the line current THD ($THD_{is}$) for both current source converters (CSC) and voltage source converters (VSC) can be expressed by a non-linear function $f_{THD}$ of the grid, PWM and load harmonics as shown in the following equation (10).

$$THD_{i_s} = \frac{\sqrt{\sum_{n=3}^{\infty} I_{sn}^2}}{I_{s1}} = f_{THD}(grid_{harmonics}; PWM_{harmonics}; load_{harmonics}), \quad (10)$$

where $I_{sn}$ is the magnitude of the $n^{th}$ harmonic of the line current.

In a CSC system (e.g., FIG. 1 above), the $h^{th}$ harmonic of the line current $i_{sh}$ is affected by the $h^{th}$ harmonic in the grid voltage $v_{sh}$, the $h^{th}$ harmonic in the PWM pattern $s_{ph}$, and the $k^{th}$ harmonic in the load current, denoted by $i_{dk}$. In this regard, the order number k can be different from the index h since the converter's load circuit (e.g., whether a DC motor load, a switching inverter stage 110b (FIG. 1), etc.) is coupled to the converter's input through the PWM switching of the active front end rectifier 110a).

In a VSC system, the $h^{th}$ harmonic of the line current, $i_{sh}$, is affected by the $h^{th}$ harmonic in the grid voltage, again denoted as $v_{sh}$, and is also affected by the $h^{th}$ harmonic in the PWM pattern used in operation of the active front end rectifier, denoted by $s_{ph}$, as well as the $k^{th}$ harmonic in the load voltage, denoted by $v_{dk}$.

In either a CSC or VSC case, therefore, the $h^{th}$ harmonic of the line current $i_{sh}$ of a converter system can be described by a non-linear function $f_{ish}$ with the inputs of $v_{sh}$, $s_{ph}$, and $i_{dk}$ (for CSC) or $v_{dk}$ (for VSC), as shown in (11).

$$\begin{cases} i_{sh,CSC} = f_{ish}(v_{sh}, s_{ph}, i_{dk}) \\ i_{sh,VSC} = f_{ish}(v_{sh}, s_{ph}, v_{dk}) \end{cases} \quad (11)$$

As seen in this equation (11), of the three variables $v_{sh}$, $s_{ph}$, and $i_{dk}(v_{dk})$, the harmonic component $s_{ph}$ is directly determined by the PWM pattern, and therefore is independent of the source harmonic and load harmonic components. Consequently, if the effect of the switching pattern harmonic component $s_{ph}$ on the line current is denoted by $i''_{sh}$, and the total effects of $v_{sh}$ and $i_{dk}(v_{dk})$ on the line current $i_s$ are combined into one component denoted as $i'_{sh}$, equation (11) can be rewritten as the following equation (12).

$$i_{sh} = i'_{sh} + i''_{sh} \quad (12)$$

as used herein, $i'_{sh}$ represents the $h^{th}$ background harmonic component, and $i''_{sh}$ represents the $h^{th}$ PWM harmonic component, where the background component $i'_{sh}$ is a function of both the source (e.g., grid) harmonics and the load harmonics. Conventional pulse width modulation (PWM) techniques, such as SHE and others, are typically employed for eliminating/minimizing the $s_{ph}$ in the PWM pattern (and therefore the effect of $i''_{sh}$). However, as shown in the above equations (11) and (12), these conventional methods cannot lead to an optimal line current harmonic performance due to the existing of the background harmonic component $i'_{sh}$ caused by the $v_{sh}$ from the grid and the $i_{dk}(v_{dk})$ from the converter's load circuit. Moreover, conventional SHE techniques are restricted by the inability to control harmonic phase angle.

Figure 10:
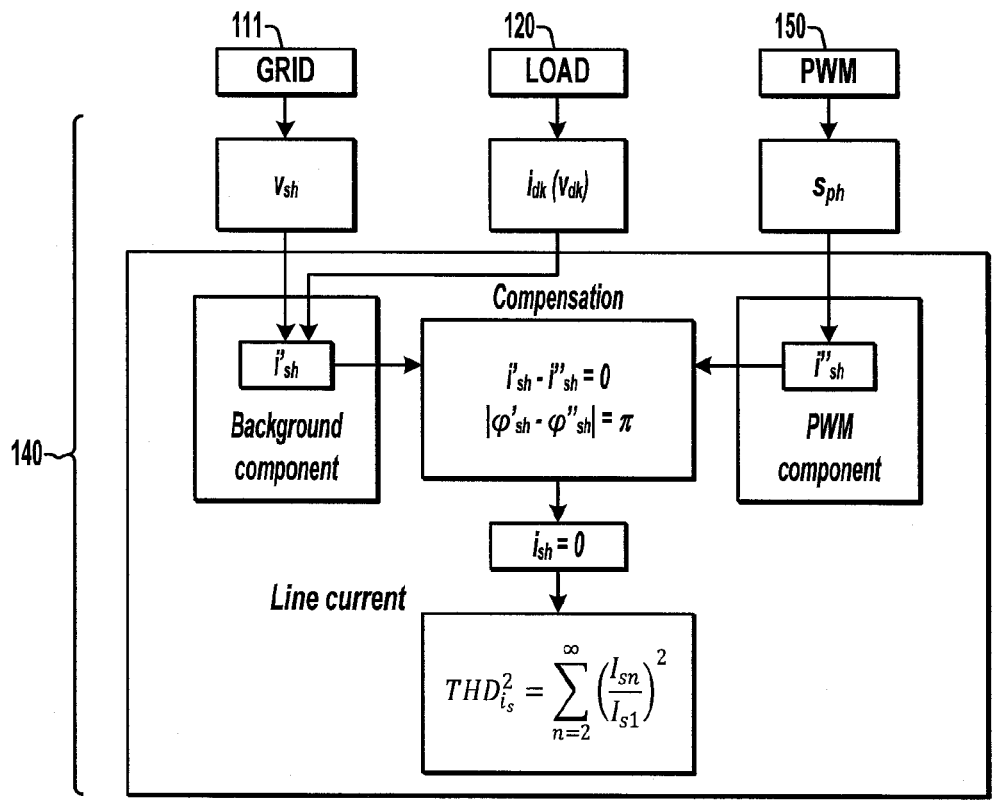
FIG. 10 is a simplified schematic diagram illustrating an exemplary adaptive harmonic mitigation (AHM) rectifier control scheme implemented in a switching controller of the power conversion system.

Referring also to FIGS. 10-13, the use of AHM PWM in certain embodiments of the switching angle generator 152 of the switching controller 140 (FIG. 1) optimizes the line current harmonic performance by adjusting the PWM component $i''_{sh}$ to compensate the background component $i'_{sh}$. FIG. 10 illustrates the basic principle of the AHM PWM control technique implemented by the switching angle generator 152.

For complete grid background harmonic compensation, the following equations (13) and (14) should be satisfied.

$$I'_{sh} - I''_{sh} = 0 \quad (13)$$

$$|\phi'_{sh} - \phi''_{sh}| = \pi \quad (14),$$

where $I'_{sh}$ and $I''_{sh}$, $\phi'_{sh}$ and $\phi''_{sh}$, are the magnitudes and phase angles of $i'_{sh}$ and $i''_{sh}$, respectively. Equations (13) and (14) indicate that optimizing the line current harmonics requires the information of the background harmonics and the full control of the magnitudes and phase angles of the PWM harmonics.

However, as noted above, conventional PWM schemes such as SHE pulse width modulation techniques that attempt to minimize the harmonics or eliminate certain harmonics do not allow for harmonic control. For example, SHE (selective harmonic elimination) provides switching angle control via an N-pulse pattern that has quarter-wave symmetry with m independent PWM switching angles, where m=(N−1)/2, and the switching pattern $s_p$ can be expressed in Fourier series, as shown in the following equation (15).

$$s_p(\omega t) = C_0 + \Sigma_{n=1}^{\infty} [S_{ph} \sin(h\omega t + \phi_{sph})]|_{h=n} \quad (15),$$

where $C_0$ is the DC offset of the pattern signal (e.g., zero), and n is the harmonic order. When n=h, the magnitude and phase angle of the $h^{th}$ harmonic $s_{ph}$ in conventional selective harmonic elimination techniques can be calculated using the following equations (16) and (17):

$$s_{ph} = \sqrt{a_h^2 + b_h^2} \; s_{ph} = \sqrt{a_h^2 + b_h^2} \quad (16)$$

$$\varphi_{sph} = \tan^{-1}\left(\frac{b_h}{a_h}\right) \varphi_{sph} = \tan^{-1}\left(\frac{b_h}{a_h}\right), \quad (17)$$

where:

$$a_h = \frac{1}{\pi} \int_0^{2\pi} [s_p(\omega t) \sin(h\omega t)] d(\omega t) \quad (18)$$

and $$b_h = \frac{1}{\pi} \int_0^{2\pi} [s_p(\omega t) \cos(h\omega t)] d(\omega t) \quad (19)$$

Further calculation yields the following equations (20) and (21):

$$a_h - \frac{4}{h\pi} \times \quad (20)$$

$$\left[ \sum_{i=1}^{m} \left( (-1)^{i+1} \times \left( \cos(h\theta_i) + \cos\left(\frac{h\pi}{3} - h\theta_i\right) \right) + (-1)^m \times \cos\left(\frac{h\pi}{6}\right) \right) \right]$$

and $$b_h = 0 \, b_h = 0 \quad (21)$$

Substituting equations (20) and (21) into equations (16) and (17) yields the following equations (22) and (23):

$$S_{ph} = |a_h| \quad (22)$$

and $$\phi_{sph} = 0 \text{ or } \pi \quad (23).$$

A conventional 7-pulse SHE switching pattern (N=7) yields $$m = \frac{(N-1)}{2} = 3.$$

Therefore, such a pattern has three independent angles, $\theta_1, \theta_2$, and $\theta_3$, and $$\theta_4 = \frac{\pi}{3} - \theta_3; \theta_5 = \frac{\pi}{3} - \theta_2; \theta_6 = \frac{\pi}{3} - \theta_1 \quad (24)$$

$$\alpha_i = \frac{2\pi}{3} + \theta_i, i = 1, 2, \ldots, 6$$

Conventional SHE PWM eliminates the selected $h^{th}$ order harmonic $s_{ph}$ by solving the equation (22) $S_{ph} = |\alpha_h| = 0$ for the switching angles $\theta$. However, equation (23) indicates that SHE cannot control the phase angles $\phi_{sph}$ of the selected harmonics. As a result, conventional SHE techniques are not well suited for optimizing line current harmonics.

Figure 11:
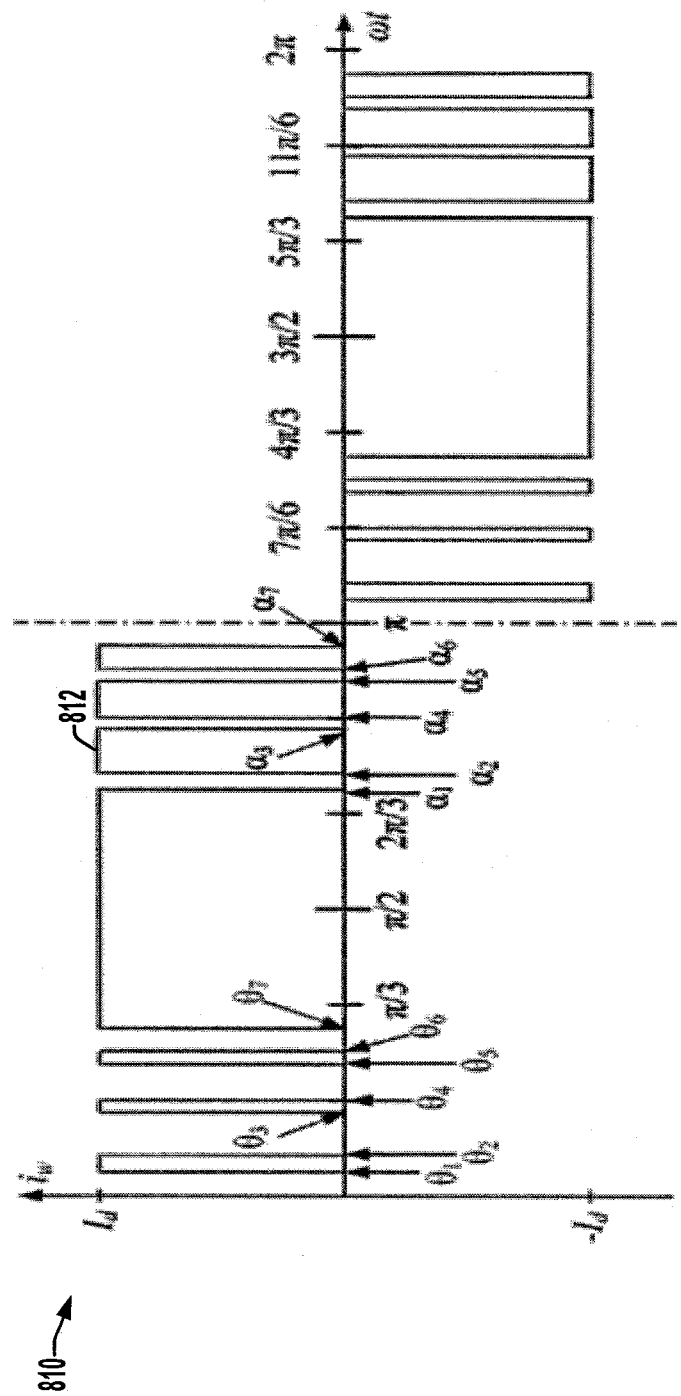
FIG. 11 is a plot showing an exemplary half-wave symmetrical AHM switching pattern without quarter-wave symmetry according to further aspects of the disclosure.

Referring also to FIG. 11, the AHM PWM, on the other hand, provides full control of both the harmonic magnitudes and phase angles of the selected harmonic components. In this regard, N-pulse AHM pattern can have N independent switching angles, and an AHM pattern does not have quarter-wave symmetry but just half-wave symmetry. Similar to the SHE, the $h^{th}$ harmonic of the AHM pattern signal can be expressed by equation (15) above. FIG. 11 illustrates an exemplary 7-pulse AHM pattern 810 with seven independent switching angles, $\theta_1, \theta_2, \theta_3, \theta_4, \theta_5, \theta_6$, and $\theta_7$. The other angles $\alpha_i$ can be derived by the following equation (25).

$$\alpha_i = \frac{2\pi}{3} + \theta_i, i = 1, 2, \ldots, 7\alpha_i = \frac{2\pi}{3} + \theta_i, i = 1, 2, \ldots, 7. \quad (25)$$

Substituting the seven independent angles $\theta_1$-$\theta_7$ and equation (25) into equations (18) and (19) yields the following equations (26a)-(26c):

$$a_h = \frac{4}{h\pi}\sin\left(\frac{h\pi}{3}\right)\left(\sum_{i=1}^{7}(-1)^{i+1}\sin\left[h\left(\theta_i + \frac{\pi}{3}\right)\right]\right) \quad (26a)$$

and $$b_h = \frac{4}{h\pi}\sin\left(\frac{h\pi}{3}\right)\left(\sum_{i=1}^{7}(-1)^{i/1}\cos\left[h\left(\theta_i + \frac{\pi}{3}\right)\right]\right) \quad (26b)$$

$h = 1, 5, 7, 11, 13, \ldots$ and $$s_{ph} = f_{sph,\theta}(\theta_1, \theta_2, \ldots, \theta_m)|_h = \sqrt{a_h^2 + b_h^2}\sin\left[h\omega t + \tan^{-1}\left(\frac{b_h}{a_h}\right)\right] \quad (26c)$$

$h = 1, 5, 7, 11, 13, \ldots$

Equations (26a), (26b) and (26c) indicate that AHM switching angle generation can be used to adjust the m independent PWM switching angles ($\theta_1 \ldots \theta_m$) to control both the magnitude and phase angle of the switching pattern harmonics $s_{ph}$. Thus, an AHM algorithm for the $h^{th}$ line current harmonic optimization can be used to generate a set of switching angles ($\theta_1 \ldots \theta_m$) that can lead to a minimized $i_{sh}$. As shown in equation (11), $i_{sh}$ is determined by the non-linear function $f_{ish}$ with three variables, $v_{sh}$, $i_{dk}(v_{dk})$ and $s_{ph}$. The variable $s_{ph}$ can be substituted by the function $f_{sph,\theta}$ given in equation (26c) which is controlled by the m independent AHM switching angles ($\theta_1 \ldots \theta_m$). Therefore, if $v_{sh}$ and $i_{dk}(v_{dk})$ can be measured or quantified and regarded as the parameters of the function $f_{ish}$, the line current harmonic $i_{sh}$ can be controlled by regulating the m independent AHM switching angles and thus (11) can be reformed to the following equation (27).

$$i_{sh} = f_{ish,\theta}(\theta_1, \theta_2, \ldots, \theta_m)\Big|_{v_{sh}, i_{dk}(v_{dk})} \xrightarrow{-0 \text{ or optimization}} AHM \quad (27)$$

Figure 12:
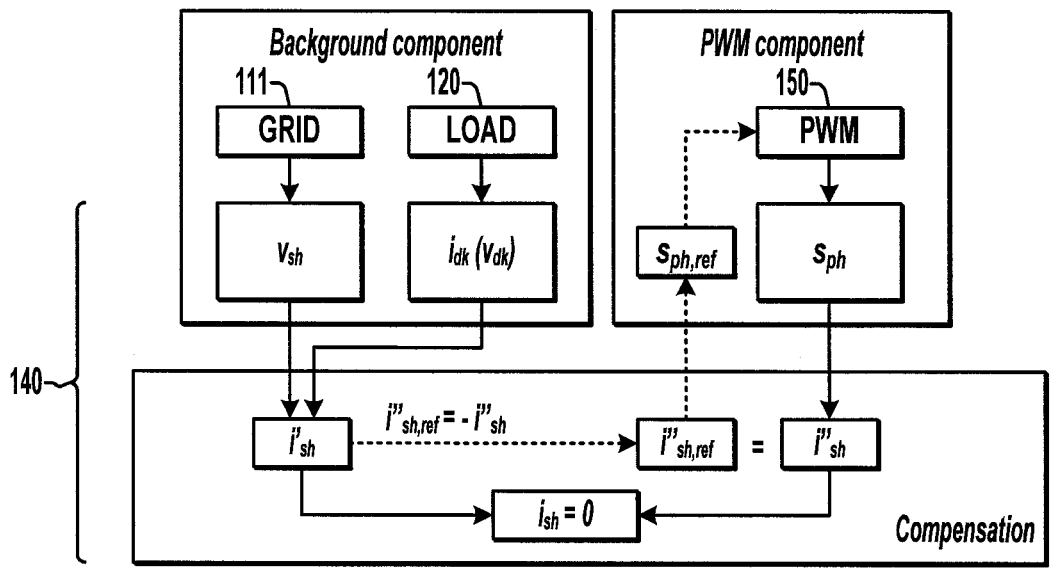
FIG. 12 is a schematic diagram illustrating adaptive harmonic mitigation switching angle control in the power converter for a line current harmonic optimization.

FIG. 12 illustrates an exemplary AHM algorithm for the $h^{th}$ harmonic optimization. Based on the known background component $i'_{sh}$, the desired PWM harmonic component, denoted as $i''_{sh,ref}$ can be calculated by equations (13) and (14) for compensating the background harmonics $i'_{sh}$. Thus, the corresponding AHM pattern, denoted by $s_{ph,ref}$ can be obtained. The reference PWM angles can be calculated by the inverse function of $f_{sph,\theta}$, as shown in the following equation (28).

$$(\theta_{1,ref}, \theta_{2,ref}, \ldots, \theta_{m,ref}) = f_{sph,\theta}^{-1}(S_{ph,ref}, \phi_{sph,ref}) \quad (28)$$

To solve the m independent switching angles $\theta_1 \ldots \theta_m$ in equation (28), m equations are derived. First, assuming m is an odd number, (m 1) equations can be formulated by setting $S_{ph} = S_{ph,ref}$ and $\phi_{sph} = \phi_{sph,ref}$. The last equation can be obtained in certain implementations by setting any other switching pattern harmonic component $S_{ph} = 0$, or by setting this component to be a flexible/free element to improve the solutions of the previous (m−1) equations which are more critical. For example, assuming a 5-pulse AHM pattern with five independent angles is used for the $5^{th}$ and $7^{th}$ line current harmonic optimization, the equation set will be given according to the following equation (29):

$$\begin{cases} S_{p5}(\theta_{1,ref}, \theta_{2,ref}, \ldots, \theta_{5,ref}) = S_{p5,ref} \\ \varphi_{s_{ph5}}(\theta_{1,ref}, \theta_{2,ref}, \ldots, \theta_{5,ref}) = \varphi_{s_{p5,ref}} \\ S_{p7}(\theta_{1,ref}, \theta_{2,ref}, \ldots, \theta_{5,ref}) = S_{p7,ref} \\ \varphi_{s_{ph7}}(\theta_{1,ref}, \theta_{2,ref}, \ldots, \theta_{5,ref}) = \varphi_{s_{p7,ref}} \\ S_{p11}(\theta_{1,ref}, \theta_{2,ref}, \ldots, \theta_{5,ref}) = 0, \text{ or free} \end{cases} \quad (29)$$

Figure 13:
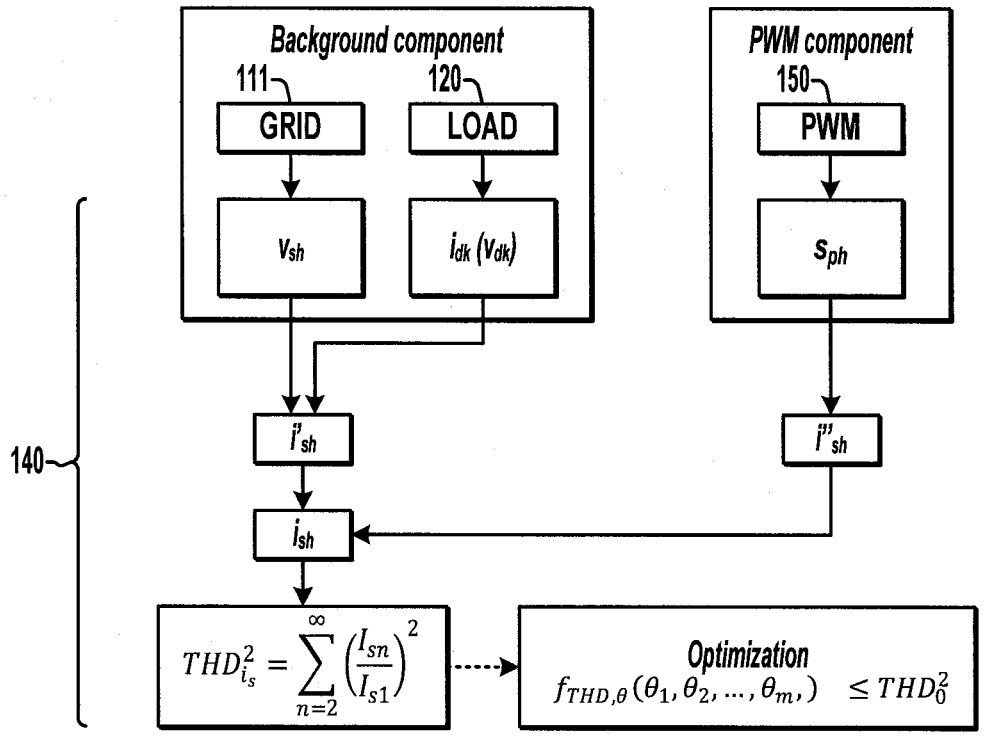
FIG. 13 is a schematic diagram illustrating AHM switching control for line current THD optimization.

Referring also to FIG. 13, the AHM technique can alternatively be used for controlling the total harmonic distortion (THD) at the power conversion system input. The line current THD optimization implementations involve finding a set of PWM switching angles $\theta_1 \ldots \theta_m$ that can provide an optimized (e.g., minimal) line current THD. As shown in equation (10), the line current THD, denoted by $THD_{i_s}$, is introduced by three factors: 1) grid voltage harmonics, 2) PWM generation (switching pattern harmonics), and 3) load circuit harmonics. According to equation (26c), the switching pattern harmonics $PWM_{harmonics}$ can be calculated by equation (30) below.

$$PWM_{harmonics} = \sum_{n=2}^{\infty} s_{pn} = \sum_{n=2}^{\infty} [f_{sph,\theta}(\theta_1, \theta_2, \ldots, \theta_m)]|_{h=n} \quad (30)$$

Therefore, the switching pattern harmonics $PWM_{harmonics}$ can be regulated by adjusting the in independent PWM switching angles. By substituting equation (30) into equation (10), the non-linear function $f_{THD}$ in (10) can be transformed when grid$_{harmonics}$ and load$_{harmonics}$ can be measured and/or quantified to the following equation (31).

$$THD_{i_s}^2 = \sum_{n=2}^{\infty} \left(\frac{I_{sn}}{I_{s1}}\right)^2 = \tag{31}$$

$$f_{THD,0}(\theta_1, \theta_2, \ldots, \theta_m)|_{grid_{harmonics};load_{harmonics}} < THD_0^2,$$

where $THD_0$ is the allowable total harmonic distortion value (e.g. set according to related standards or other user requirements). The algorithm and corresponding AHM control configuration are shown in FIG. 13.

The AHM control concepts can be advantageously employed for both target harmonic reduction and THD control in certain embodiments. This hybrid AHM approach is particularly useful when the dominant harmonics in the line current can be identified. If an AHM switching pattern (e.g., pattern 810 in FIG. 11 above) having m independent PWM angles is used to optimize n harmonics in the line current and $$n \leq \frac{(m-1)}{2},$$

then 2n equations can be fixed by setting $S_{ph} = S_{ph,ref}$ and $\phi_{s_{ph}} = \phi_{s_{ph,ref}}$, with the rest of the equations being derived based on the THD optimization purposes.

In certain cases, the $h^{th}$ harmonic in the background has dominant effects on the line side, and the effects of the other background harmonics can be substantially suppressed by the converter input filter (filter 111 in FIG. 1 above) and thus can be neglected. In this case, the AHM switching angle control can focus on the switching pattern harmonics by controlling the $s_{ph}$ to be $s_{ph,ref}$, with the other order harmonics in the PWM pattern being set to zero or minimized, as shown in the following equation (32).

$$\begin{cases} S_{ph}(\theta_{1,ref}, \theta_{2,ref}, \ldots, \theta_{m,ref}) = S_{ph,ref} \\ \varphi_{s_{ph}}(\theta_{1,ref}, \theta_{2,ref}, \ldots, \theta_{m,ref}) = \varphi_{s_{ph,ref}} \\ \sum_{n=2}^{\infty} \left(\frac{S_{pn}}{S_{p1}}\right)^2 = 0 \text{ or minimization } n \neq h \end{cases} \tag{32}$$

The magnitude $S_{ph,ref}$ and the phase angle $\phi_{s_{ph,ref}}$ of the $h^{th}$ AHM reference are used by the AHM algorithm to optimize line current harmonic performance. The effects of $v_{sh}$, $s_{ph}$, and $i_{dk}$ (or $v_{dk}$) on the line current harmonics $i_{sh}$ is denoted by $i_{sh}^{(v_s)}$, $i_{sh}^{(s_p)}$, and $i_{sh}^{(i_d)}$ or $i_{sh}^{(v_d)}$), respectively.

The converter 110a of the drive 110 in FIG. 9 can be either a CSC or a VSC. In a CSC embodiment of the converter 110 of FIG. 9, the PWM pattern generated by 150 in FIG. 9 regulates the converter input current, which is also known as PWM current, denoted by $i_w$, and therefore the load $k^{th}$ current harmonic component $i_{dk}$ and the $h^{th}$ switching pattern harmonic component $s_{ph}$ affect the line current harmonic $i_{sh}$ through the $h^{th}$ harmonic in the PWM current $i_{wh}$. In a VSC implementation, the PWM pattern generated by 150 in FIG. 9 regulates the converter input voltage, which is also known as PWM voltage, denoted by $v_w$, and therefore the load voltage $k^{th}$ harmonic component $v_{dk}$ and the $h^{th}$ switching pattern harmonic component $s_{ph}$ affect the $h^{th}$ line current harmonic $i_{sh}$ through the $h^{th}$ harmonic in the PWM voltage, denoted $v_{wh}$.

The CSC and VSC have different input circuits, which are reflected by the impedance in FIG. 9. With a VSC, the impedance of the drive 110 in FIG. 9 can be structured by a CL filter as shown in FIG. 15B or by an LCL filter as shown in FIG. 15C, while the impedance of a CSC can be structured by an LC filter, as shown in FIG. 15D. The R, $R_1$, $R_2$ in FIGS. 15B-15D represent the equivalent resistance of the line, and in some cases a damping resistor $R_c$ can be connected to the capacitor in series (not shown in the figures). Note that R, $R_1$, $R_2$, and $R_c$ are not necessarily required in the impedance circuits. Also note that some of the impedance of a VSC can be without a capacitance C.

Figure 14A:
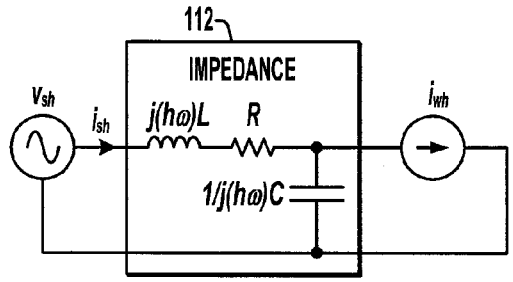
FIG. 14A is a schematic diagram illustrating $h^{th}$ harmonic model of the power conversion system in which the $h^{th}$ order harmonic of the source voltage is independent from the $h^{th}$ order harmonic of the PWM current.
Figure 14B:
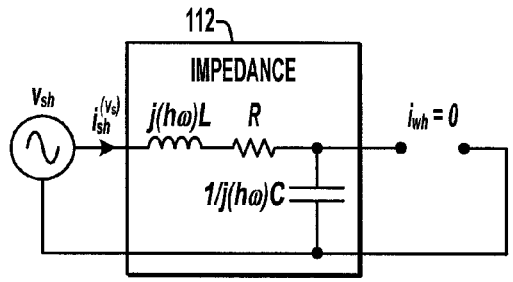
FIG. 14B is a schematic diagram illustrating another $h^{th}$ harmonic model of the power conversion system in which the $h^{th}$ order harmonic of the source voltage is calculated separately from the $h^{th}$ order harmonic of the PWM current.
Figure 14C:
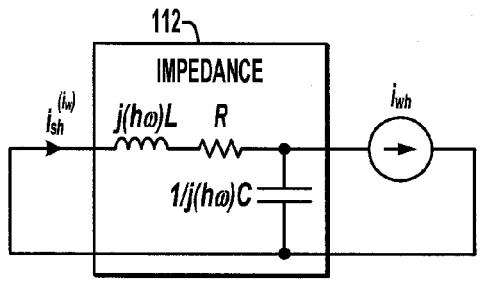
FIG. 14C is a schematic diagram illustrating another $h^{th}$ harmonic power converter model in which the $h^{th}$ order harmonic of the PWM current is calculated separately from the $h^{th}$ order harmonic of the source voltage.
Figure 14D:
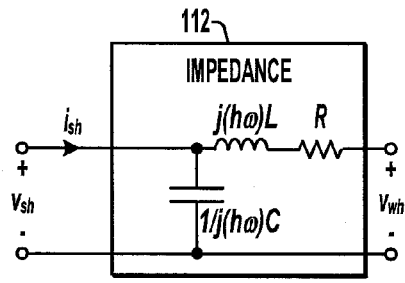
FIGS. 14D-14F are schematic diagrams illustrating $h^{th}$ harmonic models of the power conversion system with a CL filter circuit.
Figure 14E:
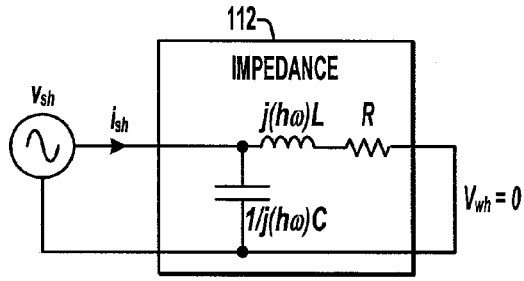
Figure 14F:
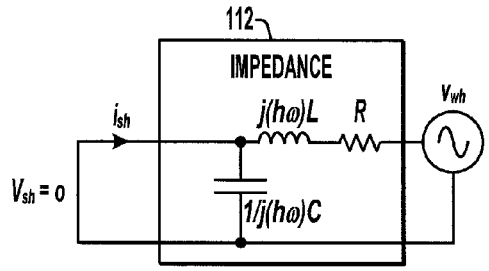

FIG. 14D illustrates the $h^{th}$ models of the converter system in FIG. 9 when the system is a VSC implementation with a CL filter given in FIG. 15B. Since the source voltage harmonic $v_{sh}$ is independent of the switching voltage harmonic $v_{wh}$, the effects of $v_{sh}$ and $v_{wh}$ on the line current harmonic $i_{sh}$ can be calculated separately, as shown in FIGS. 14E and 14F, where $v_{sh}$ and $v_{wh}$ are regarded as independent voltage sources. Therefore, from FIGS. 14E and 14F, the effect of $v_{sh}$ on $i_{sh}$ and the effect of $v_{wh}$ on $i_{sh}$ can be calculated by the transfer functions shown in the following equations (32A) and (32B), respectively:

$$TS_s = \frac{i_{sh}^{(v_s)}}{v_{sh}} \tag{32A}$$

$$TS_p = \frac{i_{sh}^{(v_w)}}{v_{wh}} \tag{32B}$$

Figure 14G:
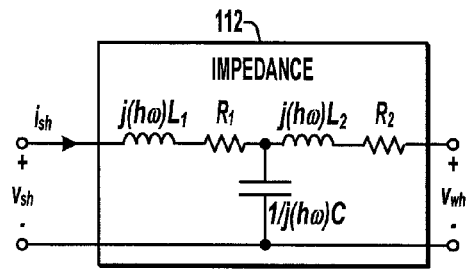
FIGS. 14G-14I are schematic diagrams illustrating $h^{th}$ harmonic models of the power conversion system with an LCL filter circuit.
Figure 14H:
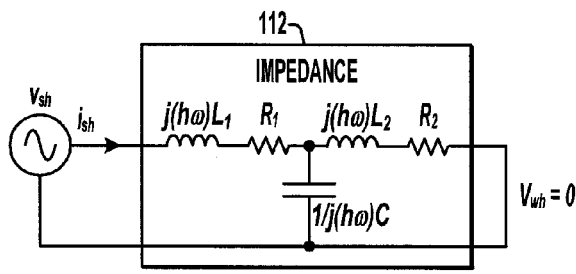
Figure 14I:
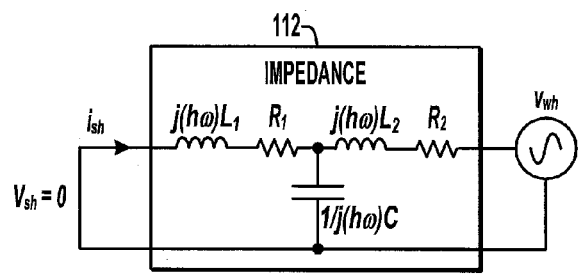

Similarly, FIG. 14G illustrates the $h^{th}$ models of the converter system in FIG. 9 when the system is a VSC implementation with a LCL filter shown in FIG. 15B. Since the source voltage harmonic $v_{sh}$ is independent of the switching voltage harmonic $v_{wh}$, the effects of $v_{sh}$ and $v_{wh}$ on the line current harmonic $i_{sh}$ can be calculated separately, as shown in FIGS. 14H and 14I, where $v_{sh}$ and $v_{wh}$ are regarded as independent voltage sources. The calculations of the effects of $v_{sh}$ and $v_{wh}$ on $i_{sh}$ in this case can also be carried out by the above equations (32A) and (32B).

Similarly, FIG. 14A illustrates the $h^{th}$ models of the converter system in FIG. 9 when the system is a CSC implementation with a LC filter given in FIG. 15D. Since the source voltage harmonic $v_{sh}$ is independent to the switching current harmonic $i_{wh}$, the effects of $v_{sh}$ and $i_{wh}$ on the line current harmonic $i_{sh}$ can be calculated separately, as shown in FIGS. 14B and 14C, where $v_{sh}$ and $i_{wh}$ are regarded as an independent voltage source and a current source respectively. The transfer functions to calculate the effects of $v_{sh}$ and $i_{wh}$ on $i_{sh}$ can be obtained as shown in the following equations (32C) and (32D) derived from FIGS. 14B and 14C.

$$TS_s = \frac{i_{sh}^{(v_s)}}{v_{sh}} \tag{32C}$$

$$TS_p = \frac{i_{sh}^{(i_w)}}{i_{wh}} \tag{32D}$$

The following illustrates an exemplary calculation for the transfer functions based on a CSC implementation including the detailed calculation of $TS_s$ and $TS_p$ and the calculation of $s_{ph,ref}$. The method can also be applied to VSC.

Referring also to FIGS. 14A-14C, the following illustrates a CSC example, and it is noted that this derived method can also be applied to VSC converter 110. FIG. 14A illustrates the $h^{th}$ model of the converter system as derived from FIG. 9. Since the source voltage harmonic $v_{sh}$ is independent of the switching current harmonic $i_{wh}$, the effects of $v_{sh}$ and $i_{wh}$ on the line current harmonic $i_{sh}$ can be calculated separately, as shown in FIGS. 14B and 14C. From FIG. 14B, the effect of $v_{sh}$ on $i_{sh}$ can be illustrated by the corresponding transfer function given in the following equation (33).

$$TS_s = \frac{i_{sh}^{(v_s)}}{v_{sh}} = \frac{[(Ch\omega)(RCh\omega)] + j[(Ch\omega)(1 - LCh^2\omega^2)]}{(1 - LCh^2\omega^2)^2 + (RSh\omega)^2} \quad (33)$$

Therefore, $$|TS_s| = \frac{|i_{sh}^{(v_s)}|}{|v_{sh}|} = \frac{Ch\omega}{\sqrt{(1 - LCh^2\omega^2)^2 + (RCh\omega)^2}} \quad (34)$$

$$\varphi_{TS_s} = \varphi_{i_{sh}^{(v_s)}} - \varphi_{v_{sh}} = \tan^{-1}\left(\frac{1 - LCh^2\omega^2}{RCh\omega}\right) \quad (35)$$

where $|TS_s|$ and $\phi_{TS_s}$ are the magnitude gain and phase shift of the transfer function $TS_s$, which yields:

$$\begin{cases} |i_{sh}^{(v_s)}| = |v_{sh}| \times |TS_s| \\ \varphi_{i_{sh}^{(v_s)}} = \varphi_{v_{sh}} + \varphi_{TS_s}. \end{cases} \quad (36)$$

For a VSC system, the transfer function $TS_s$ that calculates the effect of $v_{sh}$ on the $i_{sh}$ can also be derived by the same method.

In a CSC converter 110, the switching pattern harmonic $s_{ph}$ affects the source (line) current harmonic $i_{sh}$ through the switching current harmonic $i_{wh}$, and the effect of $i_{wh}$ on $i_{sh}$ can be expressed as a transfer function derived from FIG. 14C seen in the following equation (37).

$$TS_p = \frac{i_{sh}^{(i_w)}}{i_{wh}} = \frac{(1 - LCh^2\omega^2) - j(RSh\omega)}{(1 - LCh^2\omega^2) + (RCh\omega)^2}. \quad (37)$$

Therefore, $$|TS_p| = \frac{|i_{sh}^{(i_w)}|}{|i_{wh}|} = \frac{1}{\sqrt{(1 - LCh^2\omega^2)^2 + (RCh\omega)^2}}, \quad (38)$$

and $$\varphi_{TS_p} = \varphi_{i_{sh}^{(i_w)}} - \varphi_{i_{wh}} = \tan^{-1}\left(\frac{RCh\omega}{1 - LCh^2\omega^2}\right), \quad (39)$$

where $|TS_p|$ and $\phi_{TS_p}$ are the magnitude gain and phase shift of the transfer function $TS_p$, respectively.

In a CSC system, $i_{wh}$ can be regarded as the total effects of $s_{ph}$ and $i_{dk}$. Since $s_{ph}$ is independent of the load current harmonic $i_{dk}$, the effects of $s_{ph}$ and $i_{dk}$ on $i_{wh}$ can be calculated separately, denoted by $i_{wh}^{(s_p)}$ and $i_{wh}^{(i_d)}$. Since:

$$i_{wh}^{(s_p)} = s_{ph} \times I_d^* , i_{wh}^{(s_p)} = s_{ph} \times I_d^* \quad (40),$$

where the $I_d^*$ is the DC component of the CSC load current, $$\begin{cases} |i_{sh}^{(s_p)}| = |s_{ph}| \times I_d^* \times |TS_p| \\ \varphi_{i_{sh}^{(s_p)}} = \varphi_{s_{ph}} + \varphi_{TS_p}. \end{cases} \quad (41)$$

For a VSC system, the transfer function $TS_p$ that quantifies the effect of $v_{wh}$ on $i_{sh}$ can also be derived by the same method, and therefore, the effect of $s_{ph}$ can be calculated.

Figure 15A:
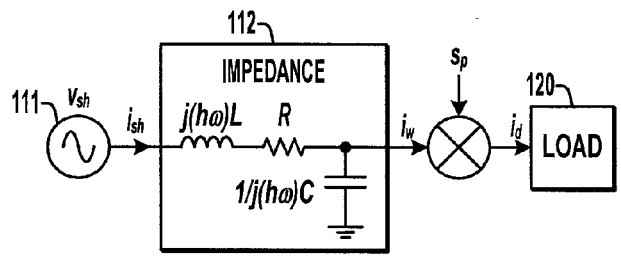
FIG. 15A is a schematic diagram illustrating a per-phase circuit of the power conversion system.
Figure 15B:
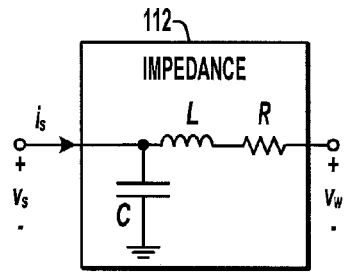
FIG. 15B is a schematic diagram illustrating a CL filter of a voltage source converter (VSC) embodiment.
Figure 15C:
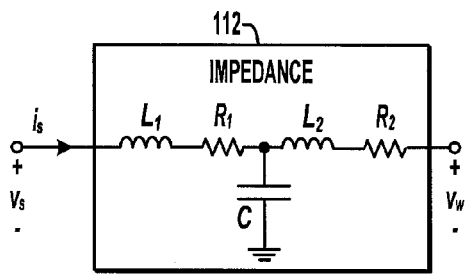
FIG. 15C is a schematic diagram illustrating an LCL filter of a voltage source converter (VSC) embodiment.
Figure 15D:
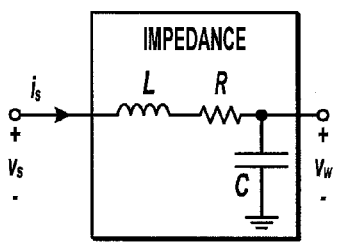
FIG. 15D is a schematic diagram illustrating an LC filter of a current source converter (CSC) embodiment.

FIG. 15A shows the per phase circuit of a three phase CSC power conversion system 110 and the reference directions of the signals. As seen in FIG. 15A, the load current $i_d$ and the PWM switching current $i_w$ are coupled by the PWM switching pattern $s_p$, which yields:

$$i_w(t) = s_p(t) \cdot i_d(t) \quad (42).$$

The load and switching currents $i_d$ and $i_w$, however, can be expressed by the Fourier series, as in the following equation (43):

$$\begin{cases} i_d(t) = \sum_k \left[\left(\frac{1}{2}I_{dk}e^{j\varphi_{i_{dk}}}e^{j\omega_k t}\right) + \left(\frac{1}{2}I_{dk}e^{j\varphi_{i_{dk}}}e^{j\omega_k t}\right)\right] \\ s_p(t) = \sum_l \left[\left(\frac{1}{2}S_{pl}e^{j\varphi_{s_{pl}}}e^{j\omega_l t}\right) + \left(\frac{1}{2}S_{pl}e^{-j\varphi_{s_{pl}}}e^{j\omega_l t}\right)\right], \end{cases} \quad (43)$$

where k and l are the order numbers. Taking Fourier transform on equation (43) yields the following equation (44):

$$\begin{cases} F_{i_d}(\omega) = \sum_k \left[\pi I_{dk}(\delta(\omega - \omega_k)e^{j\varphi_{i_{dk}}}) + \pi I_{dk}(\delta(\omega + \omega_k)e^{-j\varphi_{i_{dk}}})\right] \\ F_{s_p}(\omega) = \sum_l \left[\pi S_{pl}(\delta(\omega - \omega_l)e^{j\varphi_{s_{pl}}}) + \pi S_{pl}(\delta(\omega + \omega_l)e^{-j\varphi_{s_{pl}}})\right], \end{cases} \quad (44)$$

where $\delta(\omega)$ is the Dirac Delta function. According to the convolution theorem:

$$F_{i_w}(\omega) = \frac{1}{2\pi}F_{i_d}(\omega) * F_{s_p}(\omega) = \frac{1}{2\pi}\int_{-\infty}^{+\infty} F_{i_d}(\omega) \cdot F_{s_p}(\varepsilon - \omega) d(\omega) = \quad (45)$$

$$\frac{1}{2}\sum_{k,l} I_{dk}S_{pl}\left[\pi e^{j(\varphi_{i_{dk}} + \varphi_{s_{pl}})}\delta(\omega - (\omega_k + \omega_l)) + \right.$$

$$\pi e^{j(\varphi_{i_{dk}} + \varphi_{s_{pl}})}\delta(\omega + (\omega_k + \omega_l)) + \pi e^{j(\varphi_{i_{dk}} - \varphi_{s_{pl}})}$$

$$\left. \delta(\omega - (\omega_k - \omega_l)) + \pi e^{-j(\varphi_{i_{dk}} - \varphi_{s_{pl}})}\delta(\omega + (\omega_k - \omega_l))\right].$$

The inverse Fourier transform of equation (45) yields the following equation (46):

$$i_w(t) = \Sigma_{k,l}\{\frac{1}{4}I_{dk}S_{pl}[e^{j(\varphi_{i_{dk}} + \varphi_{s_{pl}})}e^{j(\omega_k + \omega_l)t} + e^{-j(\varphi_{i_{dk}} + \varphi_{s_{pl}})}e^{-j(\omega_k + \omega_l)t} + \quad (46)$$

$$e^{j(\varphi_{i_{dk}} - \varphi_{s_{pl}})}e^{j(\omega_k - \omega_l)t} + e^{-j(\varphi_{i_{dk}} - \varphi_{s_{pl}})}e^{-j(\omega_k - \omega_l)t}]\}$$

Therefore, the effect of $i_d$ on $i_w$ can be expressed by the following equation (47):

$$i_w^{(i_d)} = \Sigma_{k,l}\{\frac{1}{2}I_{dk}S_{pl}[\cos((\omega_k - \omega_l)\omega t + \varphi_{i_{dk}} - \varphi_{s_{pl}}) + \quad (47)$$

$$\cos((\omega_k + \omega_l)\omega t + \varphi_{i_{dk}} + \varphi_{s_{pl}})]\}$$

Assuming $\omega$ is the fundamental angular frequency, and thus $\omega_k = k\omega$ and $\omega_l = l\omega$, equation (47) can be rewritten as shown in the following equation (48):

$$i_w^{(i_d)} = \quad (48)$$

$$\Sigma_h i_{wh}^{(i_a)} = \Sigma_{k,l}\left\{\frac{1}{2}I_{dk}S_{pl}\left[\cos((k-l)\omega t + \varphi_{i_{dk}} - \varphi_{s_{pl}}) + \cos((k+l)\omega t + \varphi_{i_{dk}} + \varphi_{s_{Pl}})\right]\right\}.$$

Equation (48) shows a technique for calculating the effect of $i_d$ on $i_w$ in which the $k^{th}$ harmonic of $i_d$ can affect the $(k-1)^{th}$ and $(k+1)^{th}$ harmonics of $i_w$, where l is the order of PWM pattern $s_p$. For example, if AHM is used for $5^{th}$ background harmonic compensation, $i_{w5}^{(i_d)}$ is thus only interested by the selective harmonic cancellation (SHC) scheme and therefore h=5. Note that $s_s$ of SHC has only the $1^{st}$, $5^{th}$, $7^{th}$, $11^{th}$, $13^{th}$ harmonics according to equation (26c), which means l=1, 5, 7, 11, 13 ... assuming the $5^{th}$ harmonic in the PWM current is interested, then h=5. Since h can be either (k l) or (kıl), there are two possibilities:

1) If h=(k−l):
therefore, $$h = (k-l) = 5 \Rightarrow \begin{cases} l-1 \\ k=6 \end{cases} \text{or} \begin{cases} l-5 \\ k=10 \end{cases} \text{or} \begin{cases} l-7 \\ k=12 \end{cases} \text{or} \begin{cases} l-13 \\ k=18 \end{cases} \cdots$$

which means the $6^{th}$, $10^{th}$, $12^{th}$, $18^{th}$, ... harmonics of $i_d$ affects the $i_w$ through the $1^{st}$, $5^{th}$, $7^{th}$, $13^{th}$, ... components of $s_p$, respectively, and $$i_{wh}^{(i_d)}\Big|_{h=5} = \frac{1}{2}I_{dk}S_{pl}\cos((k-l)\omega t + \varphi_{i_{dk}} - \varphi_{s_{pl}})\Big|_{\begin{cases}l-1\\k=5\end{cases}\begin{cases}l-5\\k=10\end{cases}\begin{cases}l-7\\k=12\end{cases}\begin{cases}l-13\\k=18\end{cases}} \quad (49)$$

2) If $h = (k+l)$:
therefore, $$h = (k+l) = 5 \Rightarrow \begin{cases} l-1 \\ k=4 \end{cases}$$

which means the $4^{th}$ harmonics of $i_d$ affects the $i_w$ through the $1^{st}$ components of $s_p$, and $$i_{wh}^{(i_a)}\Big|_{h=5} = \frac{1}{2}I_{dk}S_{pl}\cos\cos((k+l)\omega t + \varphi_{i_{dk}} + \varphi_{s_{pl}})\Big|_{\begin{cases}l-1\\k=4\end{cases}} \quad (50)$$

In a rectifier converter system 110 (e.g., FIG. 1 above), the dominant harmonic orders are the multiples of 6, and therefore, =6, 12, 18 .... Since the magnitude of the $s_p$ fundamental reflects the PWM modulation index $M_\alpha$, which is much higher than the magnitudes of the harmonics, only $$\begin{cases} l-1 \\ k=5 \end{cases}$$

needs to be considered in this case.
Therefore, $$i_{w5}^{(i_d)} = -\frac{1}{2}I_{d6}M_\alpha\cos(5\omega_1 t + \varphi_{id6} - \varphi_{s1}) \quad (51)$$

For another example, if the $7^{th}$ harmonic in the PWM current is concerned, h=7 yields)

$$i_{w7}^{(i_d)} = -\frac{1}{2}m_a I_{d6}\cos(7\omega_1 t + \varphi_{s1} + \varphi_{id6}) \quad (52)$$

Therefore, according to equations (38) and (39), the effect of the $i_{dk}$ on $i_{sh}$ can be calculated by the following equations (53) and (54):

$$\left|i_{sh}^{(i_d)}\right| = \left|i_{wh}^{(i_d)}\right| \times |TS_p| \quad (53)$$

$$\varphi_{i_{sh}}^{(i_d)} - \varphi_{i_{wh}}^{(i_d)} + \varphi_{TS_p} \quad (54)$$

This method derived for CSC is also valid to VSC systems.
Since:

$$i_{sh} - i'_{sh} + i''_{sh} - i_{sh}^{(v_s)} + i_{sh}^{(i_d)} + i_{sh}^{(s_p)} \quad (55)$$

and according to the algorithm shown in FIG. 12, $s_{ph,ref}$ can be obtained by the following equation (56).

$$i_{sh}^{(s_{p,ref})} = i''_{sh,ref} = (-i'_{sh}) - (i_{sh}^{(v_s)} + i_{sh}^{(i_d)}) \quad (56).$$

By equations (38), (39), (42), (43), and (53), (54), $s_{ph,ref}$ can be calculated with determined $i_{sh}^{(v_s)}$ and $i_{sh}^{(i_d)}$ according to the following equations (57) and (58).

$$S_{ph,ref} = |S_{ph,ref}| = \frac{\left|-(i_{sh}^{(v_s)} + i_{sh}^{(i_d)})\right|}{I_d^* \times |TS_p|} \quad (57)$$

$$\varphi_{S_{ph,ref}} = \varphi_{(i_{sh}^{(v_s)} + i_{sh}^{(i_d)})} - \varphi_{TS_p} + \pi \quad (58)$$

Figure 16:
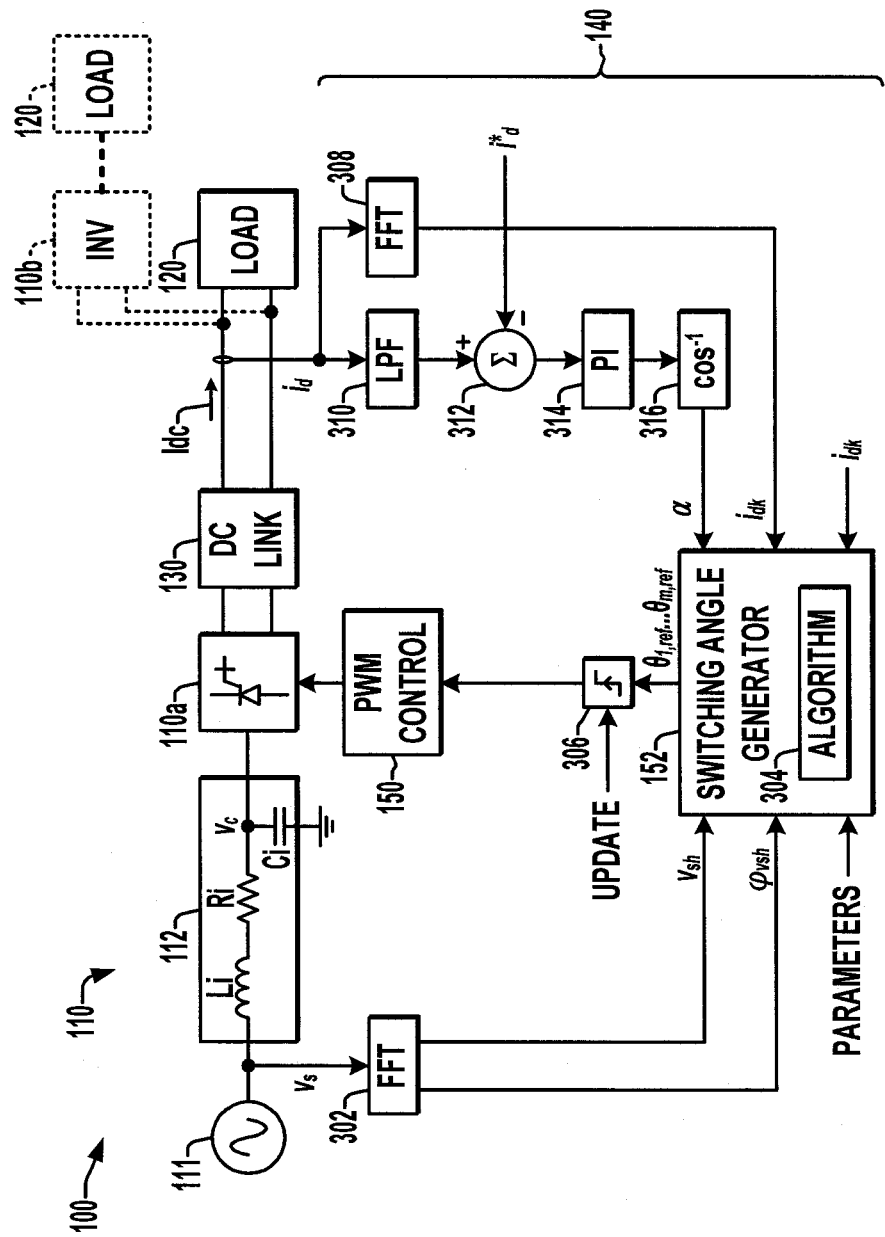
FIG. 16 is a schematic diagram illustrating AHM switching control with online PWM angle computation in the power conversion system.

FIG. 16 illustrates a first AHM control scheme (#1) for online PWM angle computation implemented with a CSC drive as an example. Note that this AHM control scheme can also be implemented with a VSC drive according to the above calculations. This AHM implementation produces a set of desired switching angles $\theta_{1,ref}$, $\theta_{2,ref}$, ..., $\theta_{m,ref}$ that generate an AHM pattern (e.g., pattern 810 in FIG. 11) fulfilling an algorithm 304 for selective harmonic reduction and/or THD control as described above. FIG. 16 illustrates and online implementation for substantially real-time angle generation, whereas the embodiment of FIG. 17 (discussed below) shows a lookup table (LUT) implementation.

In FIG. 16, the desired switching angles, $\theta_{1,ref}$, $\theta_{2,ref}$, ..., $\theta_{m,ref}$ are generated by the functional block switching angle generator 152. The source voltage harmonic components $v_{sh}$ and the load current harmonic components $i_{dk}$ are measured and computed via Fast Fourier Transformation (FFT) functions 302 and 308, respectively (implemented in the switching controller 140 in hardware and/or processor-executed software, to calculate the as described above $s_{ph,ref}$. The index k of $i_{dk}$ indicates the $k^{th}$ harmonic of the load circuit current Idc, which is normally a multiple of 6 and therefore should be equal to either (h+1) or (h−1) depending on the harmonic component index h. The converter system's parameters (indicated as PARAMETERS in the figures), such as the line inductance, line resistance, and line capacitance, are provided for use in the transfer function calculations in the switching angle generator 152. In some converter applications, the load current Idc or the real power output of the converter 110 is controlled by a delay angle loop, which is reflected by the a loop including a low pass filter 310 receiving the load current $i_d$ and providing an output to a summing junction 312 from which is subtracted a desired load current $i^*_d$. The output of the summing junction 312 is provided to a proportional/integral (PI) control component 314 and the angle α is generated for use by the switching angle generator 152 by an inverse cosine function component ($\cos^{-1}$) 316, where the components 310-316 in certain embodiments are implemented using hardware and/or processor-executed software in the switching controller 140. In FIG. 16, the α loop can cause a α-degree phase shift of the switching pattern, and thus can lead to a phase shift of (h×α) degrees in the $h^{th}$ harmonic component, which phase shift can be compensated by the in the switching angle generator 152. Note this is an exemplary a compensation method and other α compensation methods will not affect the AHM implementation. The angle generator 152 provides the PWM switching angles $\theta_{1,ref}, \theta_{2,ref}, \ldots, \theta_{m,ref}$ via an update component 306 for periodic updating to the PWM controller 150 which generates the switching control signals for the rectifier 110a.

Figure 17:
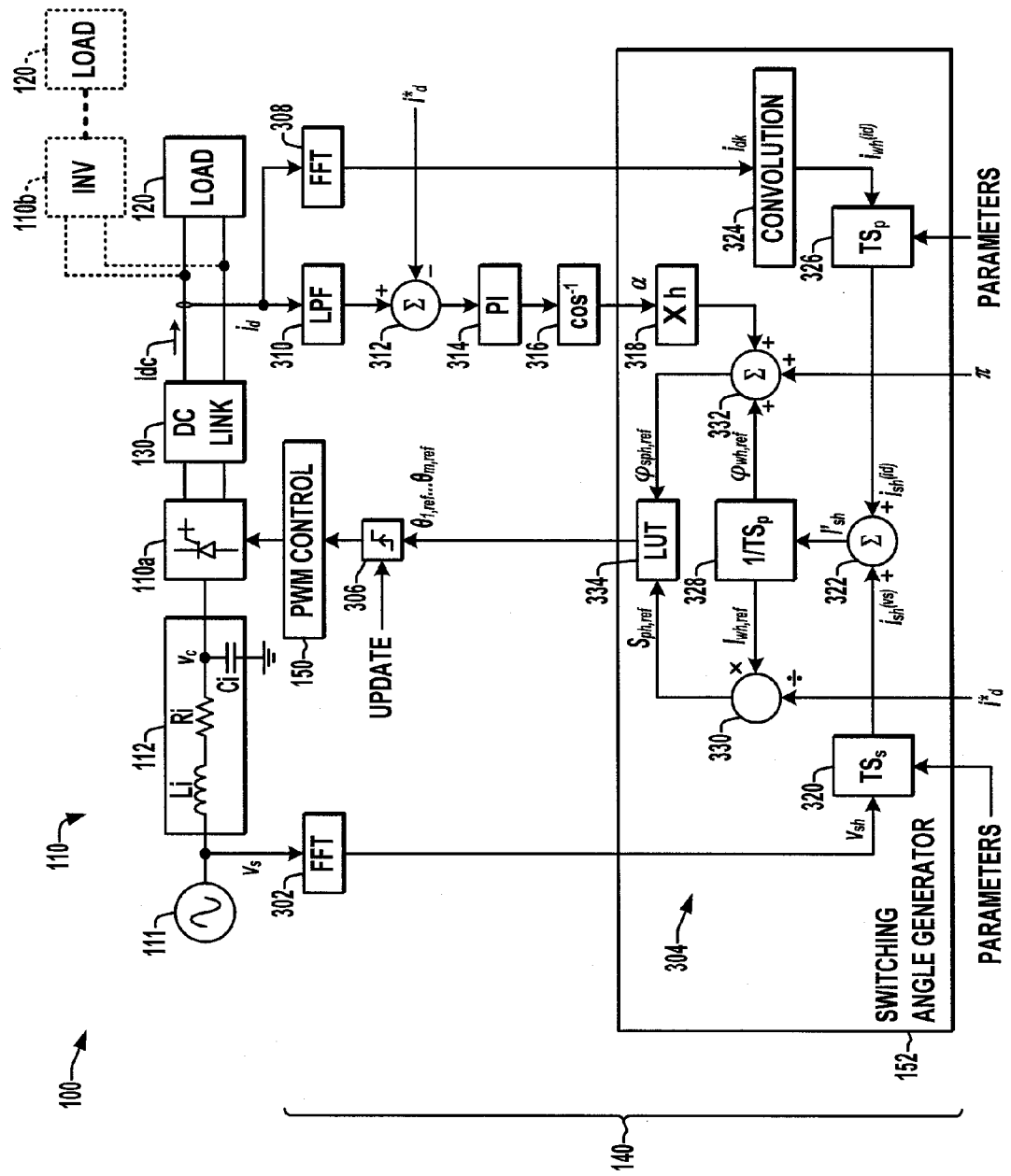
FIG. 17 is a schematic diagram illustrating AHM switching control in the power converter using a lookup table (LUT)
Figure 18:
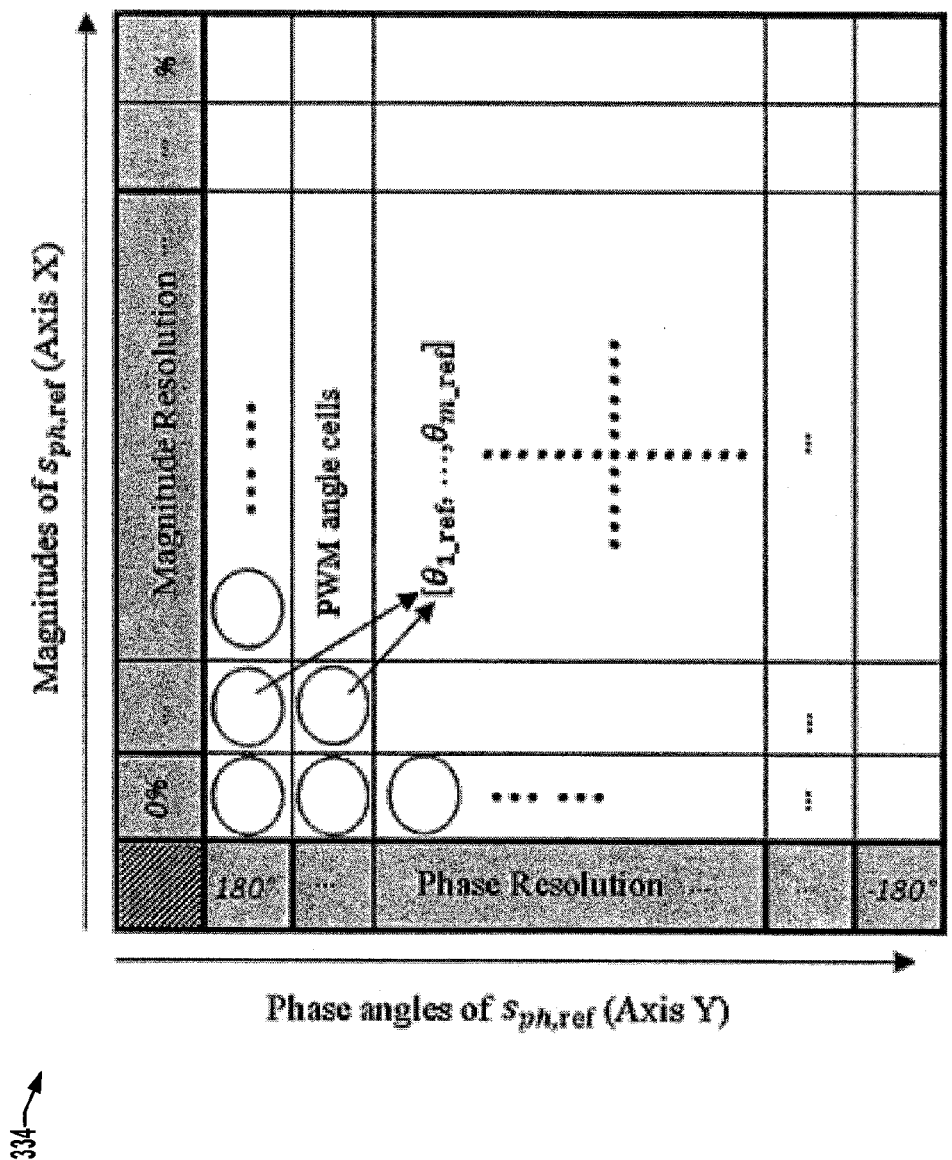
FIG. 18 is a schematic diagram illustrating further details of an exemplary AHM switching control lookup table.

FIG. 17 illustrates a second AHM control scheme for implementing the algorithm 304 (#2) using a lookup table (LUT) 334 and FIG. 18 shows an exemplary three-dimensional AHM look-up table structure 334 for $h^{th}$ line current harmonic optimization implemented with a CSC drive. Note that this AHM control scheme can also be implemented with a VSC drive according to the above calculations. According to equation (32), with the determined $s_{ph,ref}$, the reference AHM PWM angles, $\theta_{1,ref}, \theta_{2,ref}, \ldots, \theta_{m,ref}$ can be defined. Therefore, the AHM PWM angle look-up table 334 can be pre-calculated with pre-defined ranges of $S_{ph,ref}$ and $\phi_{s_{ph,ref}}$. As seen in FIG. 18, each set of the in pre-calculated PWM angles is stored in one PWM angle cell of the look-up table 334 whose location is determined by the $S_{ph,ref}$ and $\phi_{s_{ph,ref}}$. As seen in FIG. 17, the switching angle generator 152 includes a $h^{th}$ harmonic component phase angle compensation component 318 which receives the phase angle α and provides an output to a summing junction 332. The load current $k_{th}$ harmonic component $i_{dk}$ is received from the FFT component 308 and is provided to a convolution function 324 to generate the switching current $h^{th}$ harmonic component $i_{wh}^{(id)}$ which is provided as an input to the transfer function $TS_p$ (equations 37-39 above) to generate and provide the line current $h^{th}$ harmonic component $i_{sh}^{(id)}$ to a summing junction 322.

The source voltage $h^{th}$ harmonic component $v_{sh}$ is provided from the FFT component 302, along with the converter parameters, to the source transfer function 320 (equations 34 and 35 above) which provides the source voltage contribution to the line current $h^{th}$ harmonic component $i_{sh}^{(vs)}$ to the summing junction 322. The output of the summing junction is provided to an inverse transfer function ($1/TS_p$) 328 which provides a switching angle $h^{th}$ harmonic component reference $\phi_{wh,ref}$ to the summing junction 332 and provides a switching current $h^{th}$ harmonic component magnitude reference $i_{wh,ref}$ to a divider component 330. The phase angle summing junction 332 also receives the angle it as a third input and provides an $h^{th}$ harmonic component switching pattern phase angle reference $\phi_{sph,ref}$ output as one index into the lookup table 334. The divider component 330 divides the switching current $h^{th}$ harmonic component magnitude reference $i_{wh,ref}$ by the desired load current value $i*_d$ to provide the switching pattern harmonic component reference $S_{ph,ref}$ as a second index into the lookup table 334. The lookup table 334 thus outputs the selected set of m switching angles $(\theta_{1,ref} \ldots \theta_{m,ref})$ to the update component 306, for use by the PWM controller 150 in operating the switching rectifier 110a. In this manner, the outputs $(\theta_{1,ref} \ldots \theta_{m,ref})$ of the AHM look-up table 334 are updated via the update component 306 online according to the calculated $s_{ph,ref}$ in real time.

Figure 19:
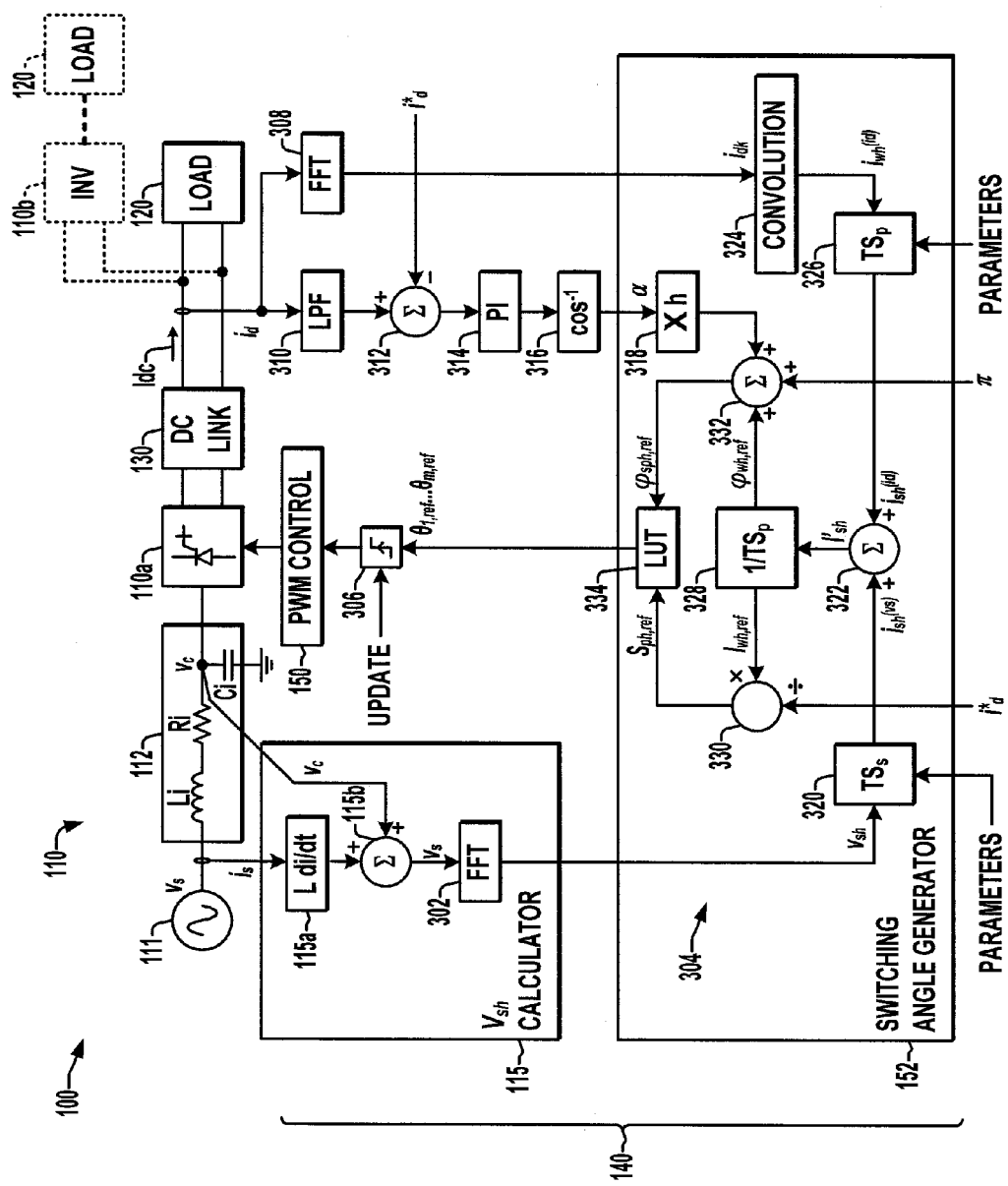
FIG. 19 is a schematic diagram illustrating another embodiment of AHM switching control in the power converter using a lookup table with a voltage calculator component.

FIG. 19 illustrates another embodiment of an AHM switching control scheme (#3) in the power converter using a lookup table with a voltage calculator component 15, and in other respects operates as described above in connection with FIG. 17. The calculator component 15 uses the measured converter input voltage (e.g., the voltage $v_c$ across the filter capacitor Ci) and the sensed line current $i_s$ to calculate the source voltage $v_s$ instead of directly measuring it. This embodiment is therefore particularly advantageous in situations where the source voltage $v_s$ is not available for measurement. In a CSC implementation, the converter input voltage is equal to the voltage across the filter capacitor Ci, and $v_s$ can be calculated using an Ldi/dt component 115a and a summer 115b based on $v_c$ and $i_s$ can according to the following equation (58A).

$$v_s = v_L + v_c = L\frac{d(i_s)}{d(t)} + v_c. \tag{58A}$$

Thus, $v_{sh}$ can be derived from the FFT component 302 based on the calculated $v_s$. The $v_{sh}$ Calculator component 115 in FIG. 19 can also be constructed to use other methods for computing or estimating $v_{sh}$ based on $v_c$ and/or $i_s$. For example, two separate FFT blocks 302 can be applied to $v_c$ and $i_s$ respectively to obtain the $v_{ch}$ and $i_{sh}$, and therefore $v_{sh}$ can be obtained. The $v_{sh}$ Calculator for a VSC with an input impedance based on a CL or LCL filter can also be derived from the FIGS. 15B and 15C by using the same methods.

Figure 20:
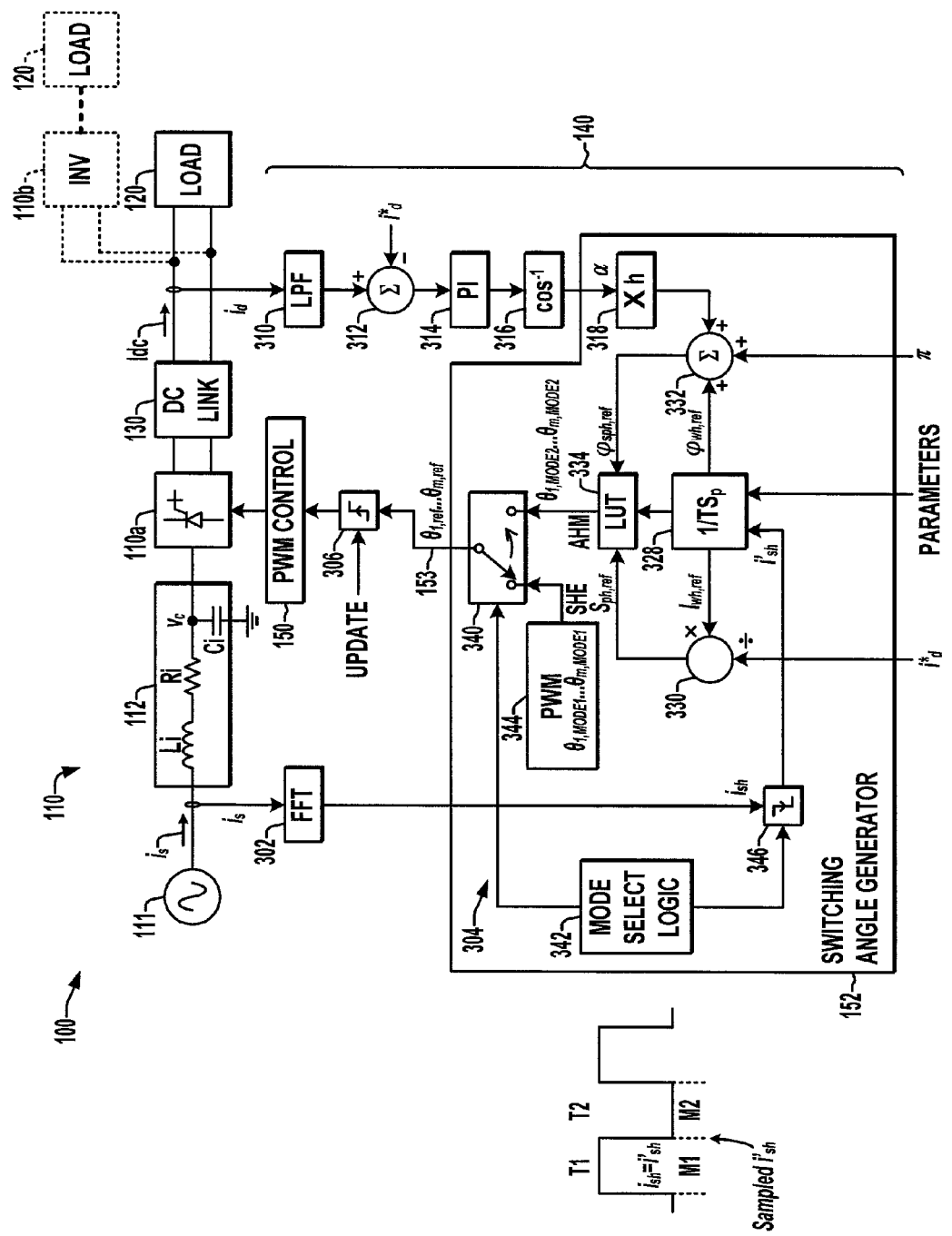
FIG. 20 is a schematic diagram illustrating dual-mode normal PWM and AHM switching control in the power conversion system using direct background harmonic detection in accordance with further aspects of the disclosure.
Figure 21:
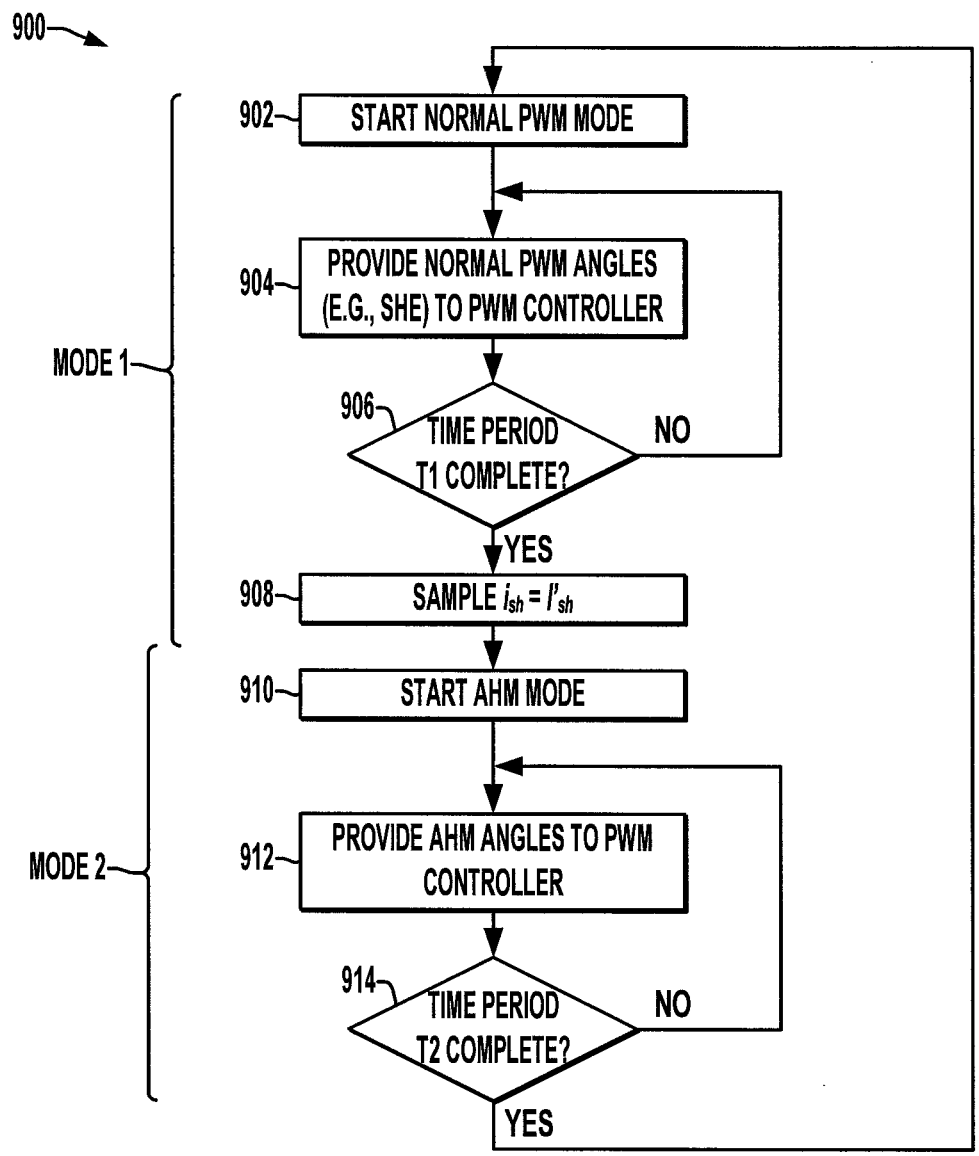
FIG. 21 is a flow diagram illustrating exemplary operation of the power conversion system for dual-mode SHE and AHM switching control.

Referring now to FIGS. 20 and 21, FIG. 20 shows a fourth AHM control scheme (#4) for direct background harmonic detection using a dual-mode switching angle generator 152 with a dual-mode switching angle generator 152 operated in a first mode during time T1 or a second mode during time T2 according to mode select logic 342. In the first mode (T1) the switching angle generator 152 provides the set of rectifier switching angles 153 ($\theta_{1,ref} \ldots \theta_{m,ref}$) via the update component 306 to the PWM controller 150 as a set of conventional PWM rectifier switching angles $\theta_{1,MODE1} \ldots \theta_{m,MODE1}$. For example, selective harmonic elimination (SHE) can be applied as the MODE1 PWM. As previously noted, the SHE angles $\theta_{1,SHE} \ldots \theta_{m,SHE}$ define a quarter-wave symmetrical selective harmonic elimination switching pattern during the first time period T1. When the mode select logic 342 sets the switching angle generator 152 into the second mode, however, the rectifier switching angles 153 to the PWM controller 150 as a set of AHM rectifier switching angles $\theta_{1,MODE2} \ldots \theta_{m,MODE2}$ as described above, which define a half-wave symmetrical adaptive harmonic mitigation switching pattern 812 (FIG. 11, without quarter-wave symmetry) according to the source harmonics and load harmonics. In the example of FIG. 20, the phase angle computation is similar to that described above in connection with FIGS. 17 and 19 (components 310-318, 328, 330 and 332). In the example of FIG. 20, however, the inverse transfer function component 328 ($1/TS_p$) receives the input $I'_{sh}$ from an update component 346 operated via the mode select logic 342 according to the $I_{sh}$ input from the source side FFT component 302. In addition, the switching angle generator 152 is provisioned with conventional PWM angles $\theta_{1,MODE1} \ldots \theta_{m,MODE1}$ 344, and the mode select logic 342 operates a logical switch 340 to selectively choose the angles 344 ($\theta_{1,MODE1} \ldots \theta_{m,MODE1}$) during the first mode T1 and the AHM angles 153 ($\theta_{1,MODE2} \ldots \theta_{m,MODE2}$) during the second mode T2 according to the mode select logic 342.

As discussed above, moreover, the switching angle generator 152 can provide the angles ($\theta_{1,MODE2} \ldots \theta_{m,MODE2}$) during the second (AHM) mode to implement control (e.g., reduction or minimization) of one or more selected harmonics and/or for THD control with respect to harmonic content of the voltage and/or current provided by the source 111. Certain embodiments of the switching angle generator 152, moreover, are operative in the second mode (T2) to generate the AHM switching angles using at least one background harmonic component i'$_{sh}$ sampled during the preceding operation in the first mode (T1). Compared to the previous AHM schemes of FIGS. 16 and 17, which required measurements of both the source voltage and load current or voltage, the AHM scheme (#4) illustrated in FIGS. 20 and 21 provides the switching angles 153 without reference to any measurement of a source voltage received by the rectifier (110a), and instead uses only the measured line current to calculate the background harmonic component and is thus particularly suitable for the applications where the source voltage at the Point of Common Coupling (PCC, at the AC input to the converter 110) is not measurable.

This dual-mode operation is further illustrated in the flow diagram 900 of FIG. 21. The first (normal) PWM mode, such as SHE, begins at 902 in FIG. 21, with the switching angle generator 152 providing normal PWM angles ($\theta_{1,MODE1}$ ... $\theta_{m,MODE1}$) to the PWM controller 150 at 904. A determination is made at 906 as to whether the first time period (T1) is completed, and if not (NO) at 906, the SHE operation continues at 904. Once T1 is complete (YES at 906), the switching angle generator 152 samples the background harmonic component i'$_{sh}$ at 908 during the operation in the first mode (T1) and begins the second mode operation at 910. During second mode operation (T2), the switching angle generator 152 provides AHM switching angles ($\theta_{1,MODE2}$ ... $\theta_{m,MODE2}$) (whether through real-time computation and/or using a lookup table 334) to the PWM controller 150 (through the update component 306) until the mode select logic 342 again switches back to the first mode (YES at 914 in FIG. 21).

The implementation of FIGS. 20 and 21 advantageously capitalizes on the ability of conventional SHE to eliminate the $s_{ph}$. As a result, with normal PWM, such as SHE, during the first operational mode T1, $i_{sh}^{(s_p)} = i''_{sh} = 0$. Therefore, it can be seen from equation (46) that normal PWM such as SHE yields $i_{sh} = i'_{sh} = i_{sh}^{(v_s)} + i_{sh}^{(i_d)}$. This implementation is termed Direct Background Harmonic Detection, and effectively obtains and updates the background harmonic component i'$_{sh}$ by switching the PWM between normal PWM, such as SHE, and AHM periodically using the mode select logic 342 of the switching angle generator 152. In one possible implementation, the mode select logic 342 can be a logically controlled square-waveform generator shown in FIG. 19 employed for the PWM switching control. During normal mode operation T1, AHM is disabled and PWM angles 344 are provided through operation of the logical switch 340. In this situation, $i_{sh} = i'_{sh} = i_{sh}^{(v_s)} + i_{sh}^{(i_d)}$. At or near the end of T1, the switching angle generator 152 samples $i_{sh}$ that equals i'$_{sh}$, and uses this for the next AHM period T2. During the subsequent period T2, the desired AHM is enabled for an optimized $i_{sh}$. The mode control/select logic 342 can switch between the modes periodically (wherein T1 may, but need not, equal T2) switching angle generator 152 may make a determination as to when to enter the 2nd mode by judging if the $i_s$ THD is acceptable.

Figure 22:
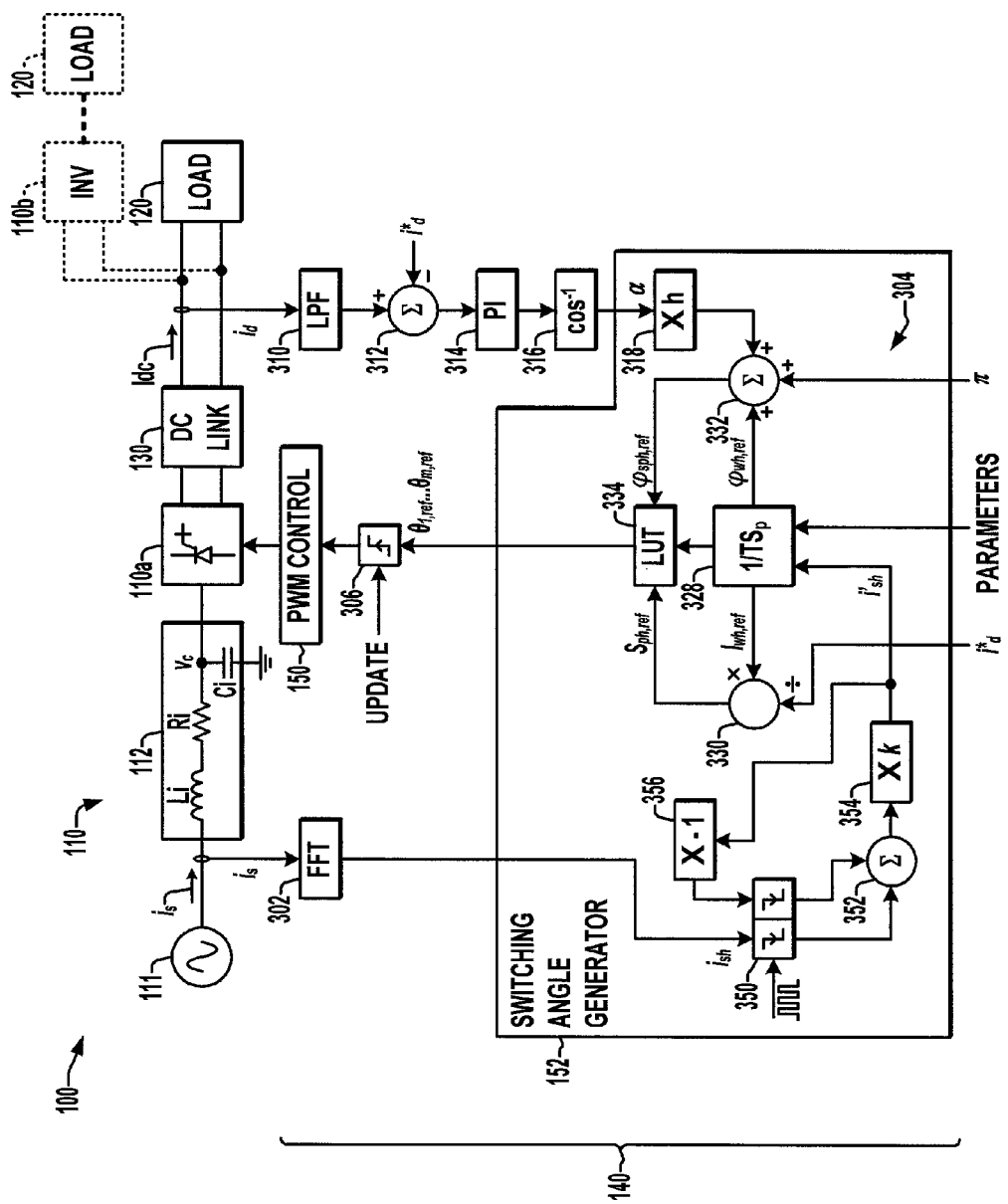
FIG. 22 is a schematic diagram illustrating AHM switching control in the power conversion system using predictive background harmonic detection.

FIG. 22 shows another AHM control scheme (#5) for predictive background harmonic detection in accordance with further aspects of the present disclosure. In this example, the FFT component 302 provides the line current harmonic components $i_{sh}$ to a pulsed update black 350 whose output is provided to a summing injunction 352 along with an updated output of a delay component 356. The delay operator 356 samples the I'$_{sh}$ value provided to the inverse transfer function 328, where the output of the summing component 352 is provided to a Xk component 352 whose output provides the I'$_{sh}$ value to the inverse transfer function 328.

In operation, the switching angle generator 152 of FIG. 22 provides the AHM rectifier switching angles ($\theta_{1,ref}$ ... $\theta_{m,ref}$) in discrete steps using a measured line current h$^{th}$ harmonic component $i_{sh_{(1)}}$ in each (current) step, as well as the switching pattern h$^{th}$ harmonic component $i_{sh_{(0)}}^{(s_p)}$ from the immediately preceding step by operation of the components 350, 352, 354 and 356 in FIG. 22. As seen in equation (55), $i_{sh}^{(s_p)}$ is controlled and is independent of the other harmonic components, and the grid voltage-related harmonic component $i_{sh}^{(v_s)}$ is also independent from the others. However, the load current harmonic component $i_{sh}^{(i_d)}$ could be affected by $i_{sh}^{(v_s)}$ and $i_{sh}^{(s_p)}$. Therefore, it may be assumed that $i_{sh}^{(i_d)}$ and $i_{sh}$ are or can be affected by $i_{sh}^{(s_p)}$ and $i_{sh}^{(v_s)}$, which yields the following equation (59).

$$i_{sh_{(1)}} = i_{sh_{(1)}}^{(v_s)} + i_{sh_{(1)}}^{(i_d)} + i_{sh_{(0)}}^{(s_p)} \quad (59),$$

where the subscripts in equation (59) indicate the sequence step numbers. For) example, $i_{sh_{(1)}}$ and $i_{sh_{(1)}}^{(i_d)}$ of current step are the responses to the $i_{sh_{(0)}}^{(s_p)}$ of previous step. There is no sequence number for $i_{sh}^{(v_s)}$ since it can be regarded as a constant. From equation (59), $$i_{sh_{(1)}} = i_{sh}^{(v_s)} + i_{sh_{(1)}}^{(i_d)} = i_{sh_{(1)}} - i_{sh_{(0)}}^{(s_p)} \quad (60)$$

Equation (60) indicates that the background harmonic component can be calculated by the measured $i_{sh}$ and the previous step $i_{sh}^{(s_p)}$. To compensate the background component i'$_{sh_{(1)}}$, the next step $i_{sh}^{(s_p)}$ should be equal to $-i'_{sh_{(1)}}$ and therefore $i_{sh_{(2)}}^{(s_p)} = -(i_{sh}^{(v_s)} + i_{sh_{(0)}}^{(s_p)})$, which also means:

$$i_{sh_{(2)}}^{(s_p)} = -(i_{sh_{(1)}} + i_{sh_{(0)}}^{(s_p)}) \quad (61)$$

Therefore, $$i_{sh_{(n+1)}}^{(s_p)} = -K(i_{sh_{(n)}} + i_{sh_{(n-1)}}^{(s_p)}) \quad (62)$$

where the factor K is applied via the component 354 and FIG. 22 to reduce the transients. Theoretically, K could be 1. However, before the system gets stable, K could be set 0.55~0.8, which depends on the system response.

The described adaptive harmonic mitigation techniques facilitate operation of grid-interfacing PWM converters as an APF in consideration of both source harmonics, PWM switching harmonics and load harmonics, whether the power conversion system 110 is implemented as an active front end (AFE) CSC or VSC converter, for any type of DC load, whether the converter 110 operates as a DC power supply or includes a switching inverter driven by the AFE. The AFE switching angle generation of the various illustrative embodiments facilitates optimizing line current harmonics through both magnitude and phase angle controls on the selected harmonics, with the ability for selected harmonic reduction and/or THD control. Moreover, the dual-mode operation of certain embodiments of the switching angle generator 152 facilitates employment of the advantages of the AHM techniques without requiring full sensor capabilities. In addition, the AHM concepts may be implemented for real-time computation and/or by using a lookup table 334.

In the AHM schemes in FIGS. 20 and 22, the line current $i_s$ is measured. However, other embodiments are possible in which $i_s$ is estimated by measuring the PWM current $i_w$ and capacitor current $i_c$, or capacitor voltage $v_c$, or other means. The current values $i_s$ or $i_{sh}$ can be obtained by similar means as in the $v_{sh}$ calculator component 115 of FIG. 19. Moreover, a variety of different embodiments are possible in which the source information can obtained by any measurement, estimation, and/or calculation techniques or combinations The following is claimed:

1. A power conversion system, comprising:
   an active rectifier including an AC input circuit with a rectifier input filter, a DC output with first and second DC output nodes, and a plurality of rectifier switching devices coupled between the AC input circuit and the DC output, the rectifier switching devices individually operative according to a corresponding rectifier switching control signal to selectively couple a corresponding AC input node with a corresponding DC output node;
   a DC circuit including first and second DC current paths coupled with the first and second DC output nodes of the rectifier;
   a PWM controller operative to provide pulse width modulated rectifier switching control signals to the rectifier to cause the rectifier to convert AC electrical input power to provide DC power to the DC circuit according to a set of rectifier switching angles; and
   a switching angle generator operative to provide the set of rectifier switching angles to the PWM controller, the switching angle generator being operative in a first mode to provide the set of rectifier switching angles to the PWM controller as a set of selective harmonic elimination rectifier switching angles defining a quarter-wave symmetrical selective harmonic elimination switching pattern, the switching angle generator being operative in a second mode to provide the set of rectifier switching angles to the PWM controller as a set of adaptive harmonic mitigation rectifier switching angles defining a half-wave symmetrical adaptive harmonic mitigation switching pattern based at least partially on source harmonics associated with AC input power received by the rectifier and load harmonics associated with a load driven by the power conversion system, wherein the adaptive harmonic mitigation switching pattern does not have quarter-wave symmetry.

2. The power conversion system of claim 1, wherein provision of the pulse width modulated rectifier switching control signals by the PWM controller to the rectifier according to the set of adaptive harmonic mitigation rectifier switching angles in the second mode controls magnitudes and phase angles of harmonic components of AC input current received by the rectifier.

3. The power conversion system of claim 2, wherein the switching angle generator is operative in the second mode to generate the set of adaptive harmonic mitigation rectifier switching angles by solving an integer number m equations determined using a nonlinear function $f_{ish}$ to reduce an integer number h harmonic components $i_{sh}$ of AC input current received by the rectifier using the formula $i_{sh} = \theta_{ish,\theta}(\theta_1, \theta_2, \ldots, \theta_m)|v_{sh}, i_{dk}(v_{dk})$, by calculating the adaptive harmonic mitigation rectifier switching angles $\theta_{1,ref}, \theta_{2,ref}, \ldots, \theta_{m,ref}$ according to a set of m equations derived from the following formula $(\theta_{1,ref}, \theta_{2,ref}, \ldots, \theta_{m,ref}) = f_{sph,\theta}^{-1}(S_{ph,ref}, \phi_{sph,ref})$, where $v_{sh}$ is an $h^{th}$ harmonic component of a source voltage received by the rectifier, $i_{dk}$ is a $k^{th}$ harmonic component of a load current provided to the DC circuit by the rectifier, $v_{dk}$ is a $k^{th}$ harmonic component of a loan voltage provided to the DC circuit by the rectifier, $S_{ph,ref}$ is an $h^{th}$ harmonic component of the half-wave symmetrical adaptive harmonic mitigation switching pattern, and $\phi_{ph,ref}$ is an $h^{th}$ harmonic component phase angle of the half-wave symmetrical adaptive harmonic mitigation switching pattern.

4. The power conversion system of claim 3, wherein the switching angle generator is operative in the second mode to generate the set of adaptive harmonic mitigation rectifier switching angles $\theta_{1,ref}, \theta_{2,ref}, \ldots, \theta_{m,ref}$ to reduce a total harmonic distortion value $THDi_s$ of AC input current $i_s$ received by the rectifier below an allowable total harmonic distortion value $THD_0$ based at least partially on source harmonics ($grid_{harmonics}$) associated with AC input power received by the rectifier and load harmonics ($load_{harmonics}$) associated with the load driven by the power conversion system using a nonlinear function $f_{THD,\theta}$ according to the following formula:

$$THD_{i_s}^2 = \sum_{n=2}^{\infty} \left(\frac{I_{sn}}{I_{s1}}\right)^2 = f_{THD,\theta}(\theta_1, \theta_2, \ldots, \theta_m,)|grid_{harmonics};load_{harmonics} \leq THD_0^2.$$

5. The power conversion system of claim 2, wherein the switching angle generator is operative in the second mode to generate the set of adaptive harmonic mitigation rectifier switching angles $\theta_{1,ref}, \theta_{2,ref}, \ldots, \theta_{m,ref}$ to reduce a total harmonic distortion value $THDi_s$ of AC input current $i_s$ received by the rectifier below an allowable total harmonic distortion value $THD_0$ based at least partially on source harmonics ($grid_{harmonics}$) associated with AC input power received by the rectifier and load harmonics ($load_{harmonics}$) associated with the load driven by the power conversion system using a nonlinear function $f_{THD,\theta}$ according to the following formula:

$$THD_{i_s}^2 = \sum_{n=2}^{\infty} \left(\frac{I_{sn}}{I_{s1}}\right)^2 = f_{THD,\theta}(\theta_1, \theta_2, \ldots, \theta_m,)|grid_{harmonics};load_{harmonics} \leq THD_0^2.$$

6. The power conversion system of claim 1, wherein the switching angle generator is operative in the second mode to generate the set of adaptive harmonic mitigation rectifier switching angles by solving an integer number m equations determined using a nonlinear function $f_{ish}$ to reduce an integer number h harmonic components $i_{sh}$ of AC input current received by the rectifier using the formula $i_{sh}=f_{ish,\theta}(\theta_1, \theta_2, \ldots, \theta_m)|v_{sh}, i_{dk}(v_{dk})$, by calculating the adaptive harmonic mitigation rectifier switching angles $\theta_{1,ref}, \theta_{2,ref}, \ldots, \theta_{m,ref}$ according to a set of m equations derived from the following formula $(\theta_{1,ref}, \theta_{2,ref}, \ldots, \theta_{m,ref})=f_{sph,\theta}^{-1}(S_{ph,ref}, \phi_{s_{ph,ref}})$, where $v_{sh}$ is an $h^{th}$ harmonic component of a source voltage received by the rectifier, $i_{dk}$ is a $k^{th}$ harmonic component of a load current provided to the DC circuit by the rectifier, $v_{dk}$ is a $k^{th}$ harmonic component of a loan voltage provided to the DC circuit by the rectifier, $S_{ph,ref}$ is an $h^{th}$ harmonic component of the half-wave symmetrical adaptive harmonic mitigation switching pattern, and $\phi_{ph,ref}$ is an $h^{th}$ harmonic component phase angle of the half-wave symmetrical adaptive harmonic mitigation switching pattern.

7. The power conversion system of claim 6, wherein the switching angle generator is operative in the second mode to generate the set of adaptive harmonic mitigation rectifier switching angles $\theta_{1,ref}, \theta_{2,ref}, \ldots, \theta_{m,ref}$ to reduce a total harmonic distortion value $THDi_s$ of AC input current $i_s$ received by the rectifier below an allowable total harmonic distortion value $THD_0$ based at least partially on source harmonics (grid$_{harmonics}$) associated with AC input power received by the rectifier and load harmonics (load$_{harmonics}$) associated with the load driven by the power conversion system using a nonlinear function $f_{THD,\theta}$ according to the following formula:

$$THD_{i_s}^2 = \sum_{n=2}^{\infty}\left(\frac{I_{sn}}{I_{s1}}\right)^2 = f_{THD,\theta}(\theta_1, \theta_2, \ldots, \theta_m,)|_{grid_{harmonics};load_{harmonics}} \le THD_0^2.$$

8. The power conversion system of claim 6, wherein the switching angle generator is operative in the second mode to generate the set of adaptive harmonic mitigation rectifier switching angles by calculating a background harmonic component without reference to any measurement of a source voltage received by the rectifier.

9. The power conversion system of claim 1, wherein the switching angle generator is operative in the second mode to generate the set of adaptive harmonic mitigation rectifier switching angles by calculating a background harmonic component without reference to any measurement of a source voltage received by the rectifier.

10. The power conversion system of claim 1, wherein the switching angle generator is operative in the second mode to generate the set of adaptive harmonic mitigation rectifier switching angles $\theta_{1,ref}, \theta_{2,ref}, \ldots, \theta_{m,ref}$ to reduce a total harmonic distortion value $THDi_s$ of AC input current $i_s$ received by the rectifier below an allowable total harmonic distortion value $THD_0$ based at least partially on source harmonics (grid$_{harmonics}$) associated with AC input power received by the rectifier and load harmonics (load$_{harmonics}$) associated with the load driven by the power conversion system using a nonlinear function $f_{THD,\theta}$ according to the following formula:

$$THD_{i_s}^2 = \sum_{n=2}^{\infty}\left(\frac{I_{sn}}{I_{s1}}\right)^2 = f_{THD,\theta}(\theta_1, \theta_2, \ldots, \theta_m,)|_{grid_{harmonics};load_{harmonics}} \le THD_0^2.$$

11. The power conversion system of claim 1, wherein the switching angle generator includes a lookup table storing predefined adaptive harmonic mitigation rectifier switching angles and is operative in the second mode to provide the set of adaptive harmonic mitigation rectifier switching angles from the lookup table.

12. The power conversion system of claim 1, wherein the switching angle generator is operative to compute the set of adaptive harmonic mitigation rectifier switching angles substantially in real time based at least partially on at least one signal or value indicative of source harmonics associated with the AC input of the rectifier, and at least one signal or value indicative of load harmonics associated with the load driven by the power conversion system.

13. The power conversion system of claim 1, wherein the switching angle generator is operative in the second mode to generate the set of adaptive harmonic mitigation rectifier switching angles using at least one background harmonic component sampled during the preceding operation in the first mode.

14. A method of operating an active rectifier in a power conversion system, the method comprising:
providing pulse width modulated rectifier switching control signals to the active rectifier to cause the rectifier to convert AC electrical input power to provide DC power to the DC circuit according to a set of rectifier switching angles;
in a first operating mode, providing the set of rectifier switching angles as a set of selective harmonic elimination rectifier switching angles defining a quarter-wave symmetrical selective harmonic elimination switching pattern; and
in a second operating mode, providing the set of rectifier switching angles as a set of adaptive harmonic mitigation rectifier switching angles defining a half-wave symmetrical adaptive harmonic mitigation switching pattern based at least partially on source harmonics associated with AC input power received by the active rectifier and load harmonics associated with a load driven by the power conversion system, wherein the adaptive harmonic mitigation switching pattern does not have quarter-wave symmetry.

15. The method of claim 14, comprising generating the set of adaptive harmonic mitigation rectifier switching angles in the second mode using at least one background harmonic component sampled during the preceding operation in the first mode.

16. The method of claim 14, comprising generating the set of adaptive harmonic mitigation rectifier switching angles in the second mode by calculating a background harmonic component without reference to any measurement of a source voltage received by the rectifier.

17. A non-transitory computer readable medium with computer executable instructions for operating an active rectifier in a power conversion system, the computer readable medium comprising computer executable instructions for:
providing pulse width modulated rectifier switching control signals to the active rectifier to cause the rectifier to convert AC electrical input power to provide DC power to the DC circuit according to a set of rectifier switching angles;
in a first operating mode, providing the set of rectifier switching angles as a set of selective harmonic elimination rectifier switching angles defining a quarter-wave symmetrical selective harmonic elimination switching pattern; and
in a second operating mode, providing the set of rectifier switching angles as a set of adaptive harmonic mitigation rectifier switching angles defining a half-wave symmetrical adaptive harmonic mitigation switching pattern based at least partially on source harmonics associated with AC input power received by the active rectifier and load harmonics associated with a load driven by the power conversion system, wherein the adaptive harmonic mitigation switching pattern does not have quarter-wave symmetry.

18. A power conversion system, comprising:
an active rectifier including an AC input circuit with a rectifier input filter, a DC output with first and second DC output nodes, and a plurality of rectifier switching devices coupled between the AC input circuit and the DC output, the rectifier switching devices individually operative according to a corresponding rectifier switching control signal to selectively couple a corresponding AC input node with a corresponding DC output node;
a DC circuit including first and second DC current paths coupled with the first and second DC output nodes of the rectifier;
a PWM controller operative to provide pulse width modulated rectifier switching control signals to the rectifier to cause the rectifier to convert AC electrical input power to provide DC power to the DC circuit according to a set of rectifier switching angles; and
a switching angle generator operative to provide the set of rectifier switching angles to the PWM controller as a set of adaptive harmonic mitigation rectifier switching angles defining a half-wave symmetrical adaptive harmonic mitigation switching pattern that does not have quarter-wave symmetry based at least partially on source harmonics associated with AC input power received by the rectifier and load harmonics associated with a load driven by the power conversion system, the switching angle generator being operative to provide the set of adaptive harmonic mitigation rectifier switching angles in discrete steps using a measured line current $h^{th}$ harmonic component associated with AC current received by the rectifier in a given current step and a switching pattern $h^{th}$ harmonic component associated with switching operation of the active rectifier in an immediately preceding step.

19. The power conversion system of claim 18, wherein the switching angle generator is operative to provide the set of adaptive harmonic mitigation rectifier switching angles in discrete steps using a background current $h^{th}$ harmonic component $i'_{sh_{(1)}}$ calculated using the measured line current $h^{th}$ harmonic component $i_{sh_{(1)}}$ associated with AC current received by the rectifier in a given current step and a switching pattern $h^{th}$ harmonic component $i_{sh_{(0)}}^{(sp)}$ associated with switching operation of the active rectifier in an immediately preceding step according to the following equation:

$$i'_{sh_{(1)}} = i_{sh_{(1)}} - i_{sh_{(0)}}^{(sp)}.$$

20. A method of operating an active rectifier in a power conversion system, the method comprising:
providing pulse width modulated rectifier switching control signals to the active rectifier to cause the rectifier to convert AC electrical input power to provide DC power to the DC circuit according to a set of rectifier switching angles; and
providing the set of rectifier switching angles as a set of adaptive harmonic mitigation rectifier switching angles defining a half-wave symmetrical adaptive harmonic mitigation switching pattern that does not have quarter-wave symmetry based at least partially on source harmonics associated with AC input power received by the rectifier and load harmonics associated with a load driven by the power conversion system, wherein the set of adaptive harmonic mitigation rectifier switching angles is provided in discrete steps using a measured line current $h^{th}$ harmonic component associated with AC current received by the rectifier in a given current step and a switching pattern $h^{th}$ harmonic component associated with switching operation of the active rectifier in an immediately preceding step.

21. A non-transitory computer readable medium with computer executable instructions for operating an active rectifier in a power conversion system, the computer readable medium comprising computer executable instructions for:
providing pulse width modulated rectifier switching control signals to the active rectifier to cause the rectifier to convert AC electrical input power to provide DC power to the DC circuit according to a set of rectifier switching angles; and
providing the set of rectifier switching angles as a set of adaptive harmonic mitigation rectifier switching angles defining a half-wave symmetrical adaptive harmonic mitigation switching pattern that does not have quarter-wave symmetry based at least partially on source harmonics associated with AC input power received by the rectifier and load harmonics associated with a load driven by the power conversion system, wherein the set of adaptive harmonic mitigation rectifier switching angles is provided in discrete steps using a measured line current $h^{th}$ harmonic component associated with AC current received by the rectifier in a given current step and a switching pattern $h^{th}$ harmonic component associated with switching operation of the active rectifier in an immediately preceding step.

22. A power conversion system, comprising:
a rectifier comprising an AC input circuit with a rectifier input filter and a plurality of AC input nodes to receive AC electrical input power, a DC output with first and second DC output nodes, and a plurality of rectifier switching devices individually coupled between one of the AC input nodes and one of the first and second DC output nodes, the rectifier switching devices individually operative to selectively couple the corresponding AC input node with the corresponding DC output node according to a corresponding rectifier switching control signal;
an intermediate DC circuit comprising first and second DC current paths coupled with the first and second DC output nodes of the rectifier;
an inverter comprising an AC output with a plurality of AC output nodes for supplying power to a load, the inverter operative to convert DC power from the intermediate circuit to provide AC electrical output power to the load;
a calculator component operative to calculate at least one computed source harmonic value indicative of source harmonics at the AC input of the rectifier based at least partially on a measured power conversion system operating signal or value; and
a switch control system with a rectifier control component comprising:
a switching angle generator operative to compute a set of rectifier switching angles substantially in real time based at least partially on the at least one computed source harmonic value and on a transfer function of the rectifier input filter, and
a PWM controller receiving the set of rectifier switching angles from the switching angle generator and operative to provide pulse width modulated rectifier switching control signals to the rectifier according to the set of rectifier switching angles to cause the rectifier to convert AC electrical input power to provide regulated DC power to the intermediate DC circuit.

* * * * *